United States Patent
Hashimoto et al.

(10) Patent No.: US 7,363,125 B2
(45) Date of Patent: Apr. 22, 2008

(54) TRACKING SYSTEM AND AUTONOMOUS MOBILE UNIT

(75) Inventors: Masahiko Hashimoto, Osaka (JP); Takehiko Suginouchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/491,034

(22) Filed: Jul. 24, 2006

(65) Prior Publication Data

US 2006/0259213 A1 Nov. 16, 2006

Related U.S. Application Data

(63) Continuation of application No. PCT/JP2005/020093, filed on Nov. 1, 2005.

(30) Foreign Application Priority Data

Jan. 28, 2005 (JP) ............... 2005-021668

(51) Int. Cl.
G01C 22/00 (2006.01)
G05D 1/00 (2006.01)

(52) U.S. Cl. .................. 701/23; 701/24; 324/635; 73/861.27

(58) Field of Classification Search ............ 701/23–24, 701/301; 324/635; 73/861.27
See application file for complete search history.

(56) References Cited

U.S. PATENT DOCUMENTS

2005/0259213 A1* 11/2005 Rankin et al. .............. 349/187

FOREIGN PATENT DOCUMENTS

| JP | 59-40278 A | 3/1984 |
| JP | 61-218974 A | 9/1986 |
| JP | 7-31244 | 4/1995 |

(Continued)

OTHER PUBLICATIONS

Tzuu-Heng S. Li et al., Fuzzy Target Tracking Control of Autonomous Mobile Robots by Using . . . , from ieeexplore.ieee.org/iel5/91/29260/01321077.pdf (IEEE Transactions on Fuzzy Systems, vol. 12, No. 4, Aug. 2004.*

(Continued)

Primary Examiner—Cuong Nguyen
(74) Attorney, Agent, or Firm—McDermott Will & Emery LLP

(57) ABSTRACT

A tracking system of the present invention includes a transponder 20 attached on a moving object 2 and an autonomous mobile unit 1 for tracking the transponder 20. The autonomous mobile unit 1 has an environment detecting means for acquiring reflection environment information relating to a wall surface 6a, 6b and 6c existing in the vicinity. In this system, the following tracking cycle is executed. The autonomous mobile unit 1 transmits a first ultrasonic wave, and upon receipt of it, the transponder 20 transmits a second ultrasonic wave. By receiving the second ultrasonic wave, the autonomous mobile unit 1 acquires reception information relating to a direct wave that directly arrives at the autonomous mobile unit 1 from the transponder 20 and a reflected wave that arrives via the wall surface. Using the reception information and the reflection environment information, the autonomous mobile unit 1 decides whether the received second ultrasonic wave is the direct wave or the reflected wave and processes the reception information based on the decision to estimate and track the position of the transponder 20.

10 Claims, 16 Drawing Sheets

FOREIGN PATENT DOCUMENTS

| | | |
|---|---|---|
| JP | 7-146366 A | 6/1995 |
| JP | 8-248125 A | 9/1996 |
| JP | 9-264948 A | 10/1997 |
| JP | 2003-15739 A | 1/2003 |
| JP | 2004-348242 A | 12/2004 |

OTHER PUBLICATIONS

D. Wormell et al., Advanced Inertial-Optical Tracking System for Wide Area Mixed and augmented reality systems, from www.isense.com/uploadedFiles/Products/White_Papers/IPT_EGVEShortPaper_AdvInertialOpticalTrackingSysFINAL.pdf, The Eurographics Association 2007.*

Akihisa Ohya et al., Intelligent escort robot moving together with human—methods for human position recognition—from www.roboken.esys.tsukuba.ac.jp/~ohya/pdf/SCIS2002-OYA.pdf.*

H.R. Everett, Douglas W. Gage, A Third Generation Security Robot, from SPIE Mobile Robot and Automated Vehicle Control Systems, Boston MA, Nov. 20-21, 1996, vol. 2903.*

A monostatic radio-acoustic sounding system used as an indoor remote temperature profiler, Weiss, M.; Knochel, R.; Instrumentation and Measurement, IEEE Transactions on, vol. 50, Issue 5, Oct. 2001 pp. 1043-1047 Digital Object Identifier 10.1109/19.963155.*

* cited by examiner

TRACKING SYSTEM AND AUTONOMOUS MOBILE UNIT

RELATED APPLICATIONS

This application is a continuation of International Application No. PCT/JP2005/020093, filed on Nov. 1, 2005, which in turn claims the benefit of 2005-021668, filed on Jan. 28, 2005, the disclosures of which Applications are incorporated by reference herein.

BACKGROUND OF THE INVENTION

1. Field of the Invention

The present invention relates to a tracking system and an autonomous mobile unit used therefor.

2. Description of the Related Art

A tracking system for controlling movement of autonomously moving unit (hereinafter also referred to as an "autonomous mobile unit"), such as a transfer robot, to track a moving object (hereinafter also referred to as a "master"), such as a human, has been used, for example, in factories. A well-known example of such a tracking system is a tracking apparatus that estimates the position of a master using ultrasonic waves.

This type of apparatus generally employs an echo scheme or a transponder scheme. In the echo scheme, only the autonomous mobile unit side has an ultrasonic transceiver, and a relative position of the master is measured by transmitting an ultrasonic wave to the master from the autonomous mobile unit side and receiving the ultrasonic wave reflected by the master at the autonomous mobile unit side. On the other hand, in the transponder scheme, each of the master and the autonomous mobile unit has an ultrasonic transceiver so that a relative position of the master is measured by mutually transmitting and receiving ultrasonic waves (for example, JP 7-31244B). In the transponder scheme, the master-side ultrasonic transceiver is called a transponder.

Conventional tracking devices, however, have experienced difficulty in estimating the position of the master if an obstacle blocking the ultrasonic wave exists on a direct path connecting the master and the autonomous mobile unit.

A method using a radar tracking apparatus is disclosed as a method for estimating the position of a object to be measured (target object) when an obstacle exists between the measured object and a device for measuring the position of the target object (JP 8-248125A). This method will be discussed with reference to FIG. 16.

In FIG. 16, a radar apparatus 202 is placed on a land that is inward of a coastline 201 so that the radar apparatus 202 looks out ships on the sea. An obstacle 203, such as an island, exists in a surveillance area of the radar apparatus 202, and the obstacle 203 forms a blind spot region 204. A primary reflector 205 for radar radio waves is set adjacent to the blind spot region 204. For the primary reflector 205, a large ship on the berth is utilized, for example. A ship under way, which is a tracked object, moves from a position 206 in a direction 207.

When the tracked object comes to a position 208 in the blind spot region 204, a radar radio wave reaches the primary reflector 205 through a propagation path 210, then reflects off the primary reflector 205, and reaches the tracked object at the position 208 through a propagation path 211. That radar radio wave reflects off the tracked object, travels via the propagation path 211, the primary reflector 205, and the propagation path 210, and reaches the radar apparatus 202, where it is received. In this case, a virtual image of the tracked object at the position 208 is displayed in the radar image at a position 209, which is behind the primary reflector 205. The position of the tracked object, which exists in the blind spot region, can be estimated from these pieces of information, utilizing the reflection path.

The method of JP 8-248125A, however, is a method used in a situation in which measurement parameters are limited, for example, in such a situation that the radar apparatus and the blind spot region of the measurement are almost fixed. For this reason, it is difficult to apply this method to a tracking system in which environment conditions change considerably from time to time.

SUMMARY OF THE INVENTION

In view of the foregoing circumstances, it is an object of the present invention to provide a tracking system that is capable of estimating a relative position of the moving object even when the direct path connecting the moving object and the autonomous mobile unit is blocked by an obstacle, and an autonomous mobile unit used therefor.

In order to accomplish the foregoing object, the present invention provides a tracking system comprising a transponder attached on a moving object, and an autonomous mobile unit for tracking the transponder: the autonomous mobile unit having a first ultrasonic transceiver device and an environment detecting means for acquiring reflection environment information relating to a wall surface existing around the autonomous mobile unit and the transponder, and the transponder having a second ultrasonic transceiver device, wherein:

(i) the autonomous mobile unit transmits a first ultrasonic wave from the first ultrasonic transceiver device;

(ii) the transponder receives the first ultrasonic wave at the second ultrasonic transceiver device and thereafter, triggered by reception of the first ultrasonic wave, transmits a second ultrasonic wave from the second ultrasonic transceiver device;

(iii) the autonomous mobile unit acquires, by receiving the second ultrasonic wave at the first ultrasonic transceiver device, reception information relating to a direct wave that directly arrives at the first ultrasonic transceiver device from the second ultrasonic transceiver device, and relating to a reflected wave that arrives at the first ultrasonic transceiver device from the second ultrasonic transceiver device by being reflected by the wall surface; and (iv) the autonomous mobile unit makes a decision whether the received second ultrasonic wave is the direct wave or the reflected wave using the reception information and the reflection environment information, and estimates a position of the transponder by processing the reception information based on the decision, to track the transponder.

It should be noted that the term "ultrasonic wave" in this description means an acoustic wave whose frequency is 20 kHz or higher. The term "wall surface" in this description refers to a surface that is at a certain angle (for example, between 80° to 100°, typically 90°) with respect to a floor surface and means a surface that reflects the ultrasonic wave. The wall surface includes a glass window, for example, in addition to a common wall. The wall surface may be either a flat surface or a curved surface.

The present invention also provides an autonomous mobile unit for use in a tracking system including a transponder attached on a moving object, and an autonomous mobile unit for tracking the transponder, the autonomous mobile unit including: a first ultrasonic transceiver device, and an environment detecting means for acquiring reflection environment information relating to a wall surface existing around the autonomous mobile unit and the transponder, wherein the autonomous mobile unit tracks the transponder by:

(I) transmitting a first ultrasonic wave from the first ultrasonic transceiver device;

(II) by receiving a second ultrasonic wave transmitted from a second ultrasonic transceiver device of the transponder as a response signal to the first ultrasonic wave at the first ultrasonic transceiver device, acquiring reception information relating to a direct wave that directly arrives at the first ultrasonic transceiver device from the second ultrasonic transceiver device and relating to a reflected wave that arrives at the first ultrasonic transceiver device from the second ultrasonic transceiver device by being reflected by the wall surface; and (III) deciding whether the received second ultrasonic wave is the direct wave or the reflected wave using the reception information and the reflection environment information, and processing the reception information based on the decision to estimate a position of the transponder.

The autonomous mobile unit and the tracking system according to the present invention estimate a relative position of a moving object using a direct wave traveling along the direct path between the moving object and the autonomous mobile unit that tracks the moving object, and a reflected wave traveling along the reflection path formed by an object existing in a surrounding environment. Therefore, the autonomous mobile unit and the tracking system according to the present invention are capable of estimating the position of a transponder and tracking the transponder even when the direct path between the transponder and the autonomous mobile unit that tracks the transponder is blocked.

DESCRIPTION OF THE PREFERRED EMBODIMENTS

Figure 1:
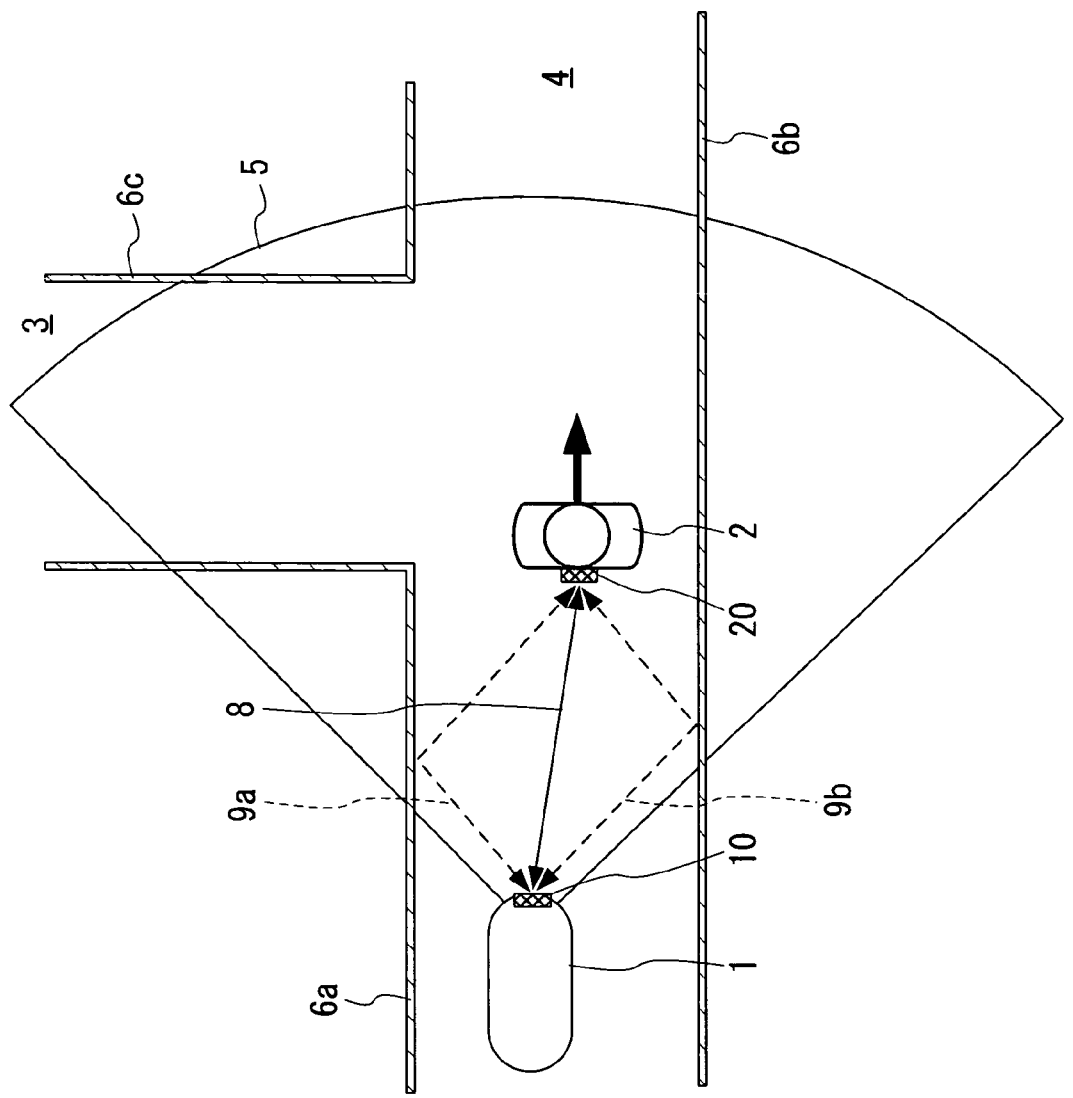
FIG. 1 illustrates one example of tracking situations in a tracking system of the present invention.

Hereinbelow, preferred embodiments of the present invention are described.

The tracking system of the present invention is a tracking system including a transponder attached on a moving object and an autonomous mobile unit that tracks the transponder. The autonomous mobile unit is provided with a first ultrasonic transceiver device and an environment detecting means for acquiring reflection environment information relating to a wall surface existing around the autonomous mobile unit and the transponder. The transponder is provided with a second ultrasonic transceiver device. In this tracking system, the following tracking cycle is repeated.

(i) The autonomous mobile unit transmits a first ultrasonic wave from the first ultrasonic transceiver device.

(ii) The transponder receives the first ultrasonic wave at the second ultrasonic transceiver device, and thereafter, triggered by reception of the first ultrasonic wave, transmits a second ultrasonic wave from the second ultrasonic transceiver device. The frequency of the second ultrasonic wave may be either the same as or different from the frequency of the first ultrasonic wave. The frequencies of the first and second ultrasonic waves are not particularly limited, and a frequency of about 20 kHz to about 100 kHz may be employed, for example.

(iii) The autonomous mobile unit acquires, by receiving the second ultrasonic wave at the first ultrasonic transceiver device, reception information relating to a direct wave that directly arrives at the first ultrasonic transceiver device from the second ultrasonic transceiver device and relating to a reflected wave that arrives at the first ultrasonic transceiver device from the second ultrasonic transceiver device by being reflected by the wall surface. The reception information includes information relating to the reception time of the second ultrasonic wave and information relating to the propagating direction of the second ultrasonic wave. Using the reception time of the second ultrasonic wave, the length of time it takes from the transmission of the first ultrasonic wave to the reception of the second ultrasonic wave is calculated.

(iv) The autonomous mobile unit makes a decision whether the received second ultrasonic wave is the direct wave or the reflected wave using the reception information and the reflection environment information, and estimates a position of the transponder by processing the reception information based on the decision. The autonomous mobile unit tracks the transponder based on the estimated position. From the reception information, information relating to the propagation direction of the second ultrasonic wave and the distance to the transponder can be obtained. If the received second ultrasonic wave is decided to be the direct wave, the information obtained from the reception information is used as it is, to estimate the position of the transponder. On the other hand, if the received second ultrasonic wave is decided to be a reflected wave, the information obtained from the reception information is processed using the reflection environment information so that it corresponds to the reflected wave, to estimate the position of the transponder.

The decision whether the received second ultrasonic wave is the direct wave or the reflected wave may be performed, for example, by determining, among the signals of the received second ultrasonic wave, a signal in a predetermined time range to be the direct wave or the reflected wave and separating that portion of the signal.

The shorter the time length it takes to perform the foregoing process cycle (i)-(iv) is, the higher the accuracy in the estimation of the position of the transponder can be. Although the time it takes to perform one process cycle varies depending on the conditions of tracking, it takes about 30 milliseconds to about 500 milliseconds in a typical example.

The above-mentioned ultrasonic transceiver device is a device for transmitting and receiving ultrasonic waves, and includes an ultrasonic transmitter device and an ultrasonic receiver device. The ultrasonic transmitter device includes an ultrasonic transmitter and may further include a transmission circuit for driving the ultrasonic transmitter. The ultrasonic receiver device includes an ultrasonic receiver, and may further include a reception circuit for driving the ultrasonic receiver. It should be noted that the first ultrasonic transceiver device generally includes two or more ultrasonic receivers disposed spaced apart at a certain distance. By using two or more ultrasonic receivers, the direction of the arrived ultrasonic wave can be identified. Usually, two ultrasonic receivers are employed. The two ultrasonic receivers are disposed at a predetermined interval (for example, from about 10 cm to about 1 m) so that the linear line connecting the two ultrasonic receivers each other can become substantially parallel to the floor surface.

The reflection environment information includes information relating to the arrangement of wall surfaces that reflect ultrasonic waves. This reflection environment information is acquired prior to the foregoing step (iv), using the environment detecting means.

In the tracking system of the present invention, prior to the step (iv), the autonomous mobile unit may estimate ultrasonic wave propagation paths including a direct path directly connecting the first ultrasonic transceiver device and the second ultrasonic transceiver device and a reflection path connecting the first ultrasonic transceiver device and the second ultrasonic transceiver device via the wall surface, using the reflection environment information and predicted position information relating to a predicted position of the transponder. In addition, in the step (iv), the autonomous mobile unit may execute the foregoing decision, that is, the decision of whether the received second ultrasonic wave is the direct wave or the reflected wave, using the propagation paths and the reception information.

The predicted position information is information relating to a predicted relative position of the transponder, which is determined taking into consideration the relative position of the transponder that has been estimated in the most recent tracking cycle. It should be noted that at the start of the tracking, there may be a case in which the information relating to a predicted position cannot be obtained. In that case, tracking according to an ordinary tracking method may be carried out without using reflected waves only for the first cycle after the start of the tracking.

In the tracking system of the present invention, in the step (iv), if the received second ultrasonic wave is decided to be the direct wave, the autonomous mobile unit may estimate a second ultrasonic wave transmission position that is calculated from the reception information (virtual transmission position) to be the position of the transponder; and if the received second ultrasonic wave is decided to be the reflected wave, the autonomous mobile unit estimates a position symmetrical to the just-mentioned virtual transmission position with respect to an obstacle data indicating the wall surface that has reflected the reflected wave to be the position of the transponder. By the reception information, the propagation direction of the second ultrasonic wave and the propagation distance of the second ultrasonic wave can be calculated, and from the propagation direction and the propagation distance, the virtual transmission position of the second ultrasonic wave can be calculated.

In accordance with a first example of the case in which the foregoing decision of whether the received second ultrasonic wave is the direct wave or the reflected wave is made, in the step (iv), the autonomous mobile unit may calculate a first reception time period in which the second ultrasonic wave is anticipated to be received when the first and second ultrasonic waves propagate through the direct path, and a second reception time period in which the second ultrasonic wave is anticipated to be received when the first and second ultrasonic waves propagate through the reflection path. Also, the autonomous mobile unit may decide that the second ultrasonic wave received in the first reception time period is the direct wave, and that the second ultrasonic wave received in the second reception period is the reflected wave. Since the reception information of the second ultrasonic wave includes information relating to the reception time of the second ultrasonic wave, an ultrasonic wave propagation path can be estimated by comparing the reception time and the calculated reception time period. It should be noted that it is possible to calculate a reception time period in which the second ultrasonic wave is anticipated to be received in the case that the first ultrasonic wave propagates through the direct path and the second ultrasonic wave propagates through the reflection path. And the propagation paths may be estimated by using the reception time period.

In the first example, the predicted position information may include information relating to traveling speed of the moving object. By taking the traveling speed (particularly its upper limit) of the moving object into consideration, accuracy in the decision of ultrasonic wave propagation paths can be enhanced. Moreover, the predicted position information may include information relating to the trajectory of movements of the moving object.

In accordance with a second example of the case in which the foregoing decision of whether the received second ultrasonic wave is the direct wave or the reflected wave is made, in the step (iv), the autonomous mobile unit may calculate a propagation path of the second ultrasonic wave from the reception information; and if the propagation path does not intersect an obstacle data indicating the wall surface, the autonomous mobile unit may decide that the received second ultrasonic wave is the direct wave; and if the propagation path intersects the obstacle data indicating the wall surface, the autonomous mobile unit may decide that the received second ultrasonic wave is the reflected wave.

In the foregoing first and second examples, in the step (iv), if the received second ultrasonic wave is decided to be the direct wave, the autonomous mobile unit may estimate a transmission position of the second ultrasonic wave (virtual transmission position) that is calculated from the reception information to be the position of the transponder; and if the received second ultrasonic wave is decided to be the reflected wave, the autonomous mobile unit may estimate a position symmetrical to the just-mentioned virtual transmission position with respect to an obstacle data indicating the wall surface that has reflected the reflected wave to be the position of the transponder.

In the tracking system of the present invention, the environment detecting means may be at least one sensor selected from a photoelectric sensor and an ultrasonic sensor. In the case of using the photoelectric sensor, generally, a photodetector element of the photoelectric sensor measures the light emanating from the light source of the photoelectric sensor and reflecting off an object existing around the autonomous mobile unit. Likewise, in the case of using an ultrasonic sensor, an ultrasonic receiver measures an ultrasonic wave transmitted from an ultrasonic transmitter and being reflected by an object existing around the autonomous mobile. The ultrasonic transceiver of the ultrasonic sensor is usually provided separately from the first ultrasonic transceiver. The reflection environment information relating to the wall surfaces existing around the autonomous mobile unit and the transponder can be obtained from the measurement data by the sensor. The measurement data is subjected to data processing, such as smoothing and segmentation. The details of these processes will be discussed later.

In the tracking system of the present invention, the moving object may be a human, and the autonomous mobile unit may be a cart. Such a system may be used in such situations as factories, shopping malls, airports, and railway stations, in which baggage needs to be transferred along with humans.

The autonomous mobile unit according to the present invention is the autonomous mobile unit of the foregoing tracking system. This autonomous mobile unit is provided with a first ultrasonic transceiver device and an environment detecting means for acquiring reflection environment information relating to a wall surface existing around the autonomous mobile unit, and a transponder. This autonomous mobile unit repeats the following tracking cycle.

(I) Transmit a first ultrasonic wave from the first ultrasonic transceiver device.

(II) Acquire reception information by receiving a second ultrasonic wave transmitted from a second ultrasonic transceiver device of the transponder as a response signal to the first ultrasonic wave at the first ultrasonic transceiver device, the reception information relating to a direct wave that directly arrives at the first ultrasonic transceiver device from the second ultrasonic transceiver device and relating to a reflected wave that arrives at the first ultrasonic transceiver device from the second ultrasonic transceiver device by being reflected by the wall surface.

(III) Decide whether the received second ultrasonic wave is the direct wave or the reflected wave using the reception information and the reflection environment information, and process the reception information based on the decision to estimate a position of the transponder. Then, based on the estimated position, the autonomous mobile unit tracks the transponder.

The processes (I), (II), and (III) correspond to the foregoing processes (i), (iii), and (iv), respectively. The autonomous mobile unit of the present invention may have the features that the previously-described autonomous mobile unit of the tracking system of the present invention has.

One Example of Embodiments

Hereinbelow, embodiments of the present invention are described with reference to the drawings. It should be noted that in the drawings, same components may be denoted by same reference numerals, and further elaboration thereof may be omitted. In the following, an example is described in which the reflection environment information (obstacle information) is obtained using a photoelectric sensor.

FIG. 1 illustrates the outline of the system according to the present invention. An autonomous mobile unit 1 that moves autonomously is a cart for transferring baggage, for example. The autonomous mobile unit 1 is provided with a tracking device 10. A moving object 2 is a human, and a transponder 20 having an ultrasonic transmitting and receiving function is disposed on the back of the moving object 2. In the example of FIG. 1, the moving object 2 is moving along a passage 4, to which a side passage 3 is connected, in the direction indicated by the arrow, and the autonomous mobile unit 1 is tracking the moving object 2 and moving toward the moving object 2. Wall surfaces 6a, 6b, and 6c that are erected substantially perpendicular to the floor surface exist around the autonomous mobile unit 1 and the moving object 2.

In this system, the relative position of the transponder 20 with respect to the tracking device 10 is estimated by transmitting and receiving ultrasonic waves between the tracking device 10 and the transponder 20. Based on the estimated relative position, the autonomous mobile unit 1 executes the tracking.

In the case of the environment shown in FIG. 1, a direct path 8, a reflection path 9a originating from the wall 6a, and a reflection path 9b originating from the wall 6b exist as the ultrasonic wave propagation paths between the tracking device 10 of the autonomous mobile unit 1 and the transponder 20. In both the reflection paths, the number of reflection is one time. There exist reflection paths in which the number of reflection is two or more times, but taking into consideration that errors in estimating positions will increase and that sensitivity will reduce due to attenuation characteristics of ultrasonic waves or the like, use of the reflection paths in which the number of reflection is one time is suitable.

Figure 2:
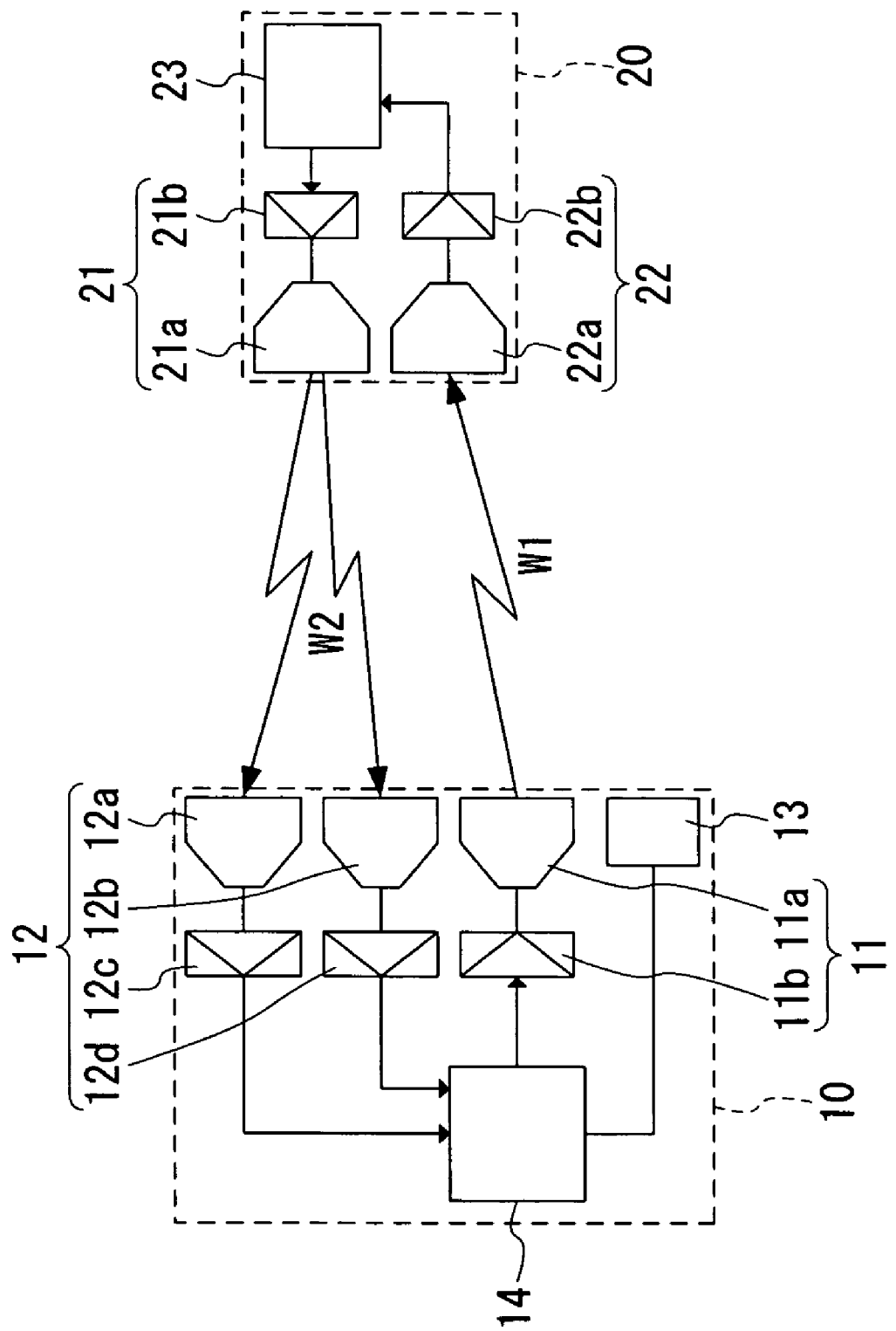
FIG. 2 schematically illustrates the outline of a tracking device and a transponder in one example of the tracking system of the present invention.

The method of deciding the relative position of the transponder 20 will be described in detail with reference to FIGS. 1 and 2. FIG. 2 schematically illustrates the configuration of one example of the tracking device 10 and the configuration of one example of the transponder 20. The tracking device 10 is provided with a first ultrasonic transceiver device (a first ultrasonic transmitter device 11 and a first ultrasonic receiver device 12) and a photoelectric sensor 13. The ultrasonic transmitter device 11 includes an ultrasonic transmitter 11a and a transmission circuit 11b connected thereto. The ultrasonic receiver device 12 is provided with two ultrasonic receivers 12a and 12b and reception circuits 12c and 12d respectively connected thereto. These devices and the sensor are connected to an arithmetic processing unit (CPU) 14. The arithmetic processing unit 14 is either provided with a storage means (memory) for storing such data as past trajectory data of the transponder 20, or connected to an external storage device. The arithmetic processing unit 14 performs estimation of ultrasonic wave propagation paths and processing of reception information, and thereby estimates the relative position of the transponder 20.

The transponder 20 is provided with a second ultrasonic transceiver device (a second ultrasonic transmitter device 21 and a second ultrasonic receiver device 22). The ultrasonic transmitter device 21 is provided with an ultrasonic transmitter 21a and a transmission circuit 21b. The ultrasonic receiver device 22 is provided with an ultrasonic receiver 22a and a reception circuit 22b. These devices are connected to an arithmetic processing unit 23.

In the case that the moving object 2 is a human, it may be assumed that its normal speed is about 4 km per hour and the maximum speed is about 6 km per hour (about 1.6 m/s). In that case, the traveling speed of the autonomous mobile unit 1 may be sufficient as long as it is comparable to that of human, so the maximum relative distance (measurement limit) can be set at about 5 m to 10 m, for example, taking the time delay it takes for the autonomous mobile unit 1 to start moving from the stationary state at the start of tracking into consideration. The frequency of the ultrasonic wave to be used may be determined taking into consideration parameters such as the measurement limit and the lengths of reflection paths, and the attenuation characteristics of the ultrasonic wave in the atmospheric air. For example, when the measurement limit is set at 5 m, an ultrasonic wave of 100 kHz or lower is suitable. It should be noted that, assuming that the maximum speed of the moving object 2 is 6 km per hour and the time required for one process cycle of the foregoing processes (i) to (iv) is 80 milliseconds, the maximum moving distance of the moving object 2 during the process cycle is 13.3 cm.

The ultrasonic transmitter and ultrasonic receiver that use flexural vibrators of piezoelectric ceramic, or the ultrasonic transmitter and receiver that use a PVDF piezoelectric polymer film as a vibrator may be utilized as the ultrasonic transmitters and the ultrasonic receivers.

A first ultrasonic wave W1 is transmitted from the ultrasonic transmitter device 11 of the autonomous mobile unit 1. The first ultrasonic wave W1 is received at the ultrasonic receiver device 22 of the transponder 20. Using this reception as a trigger signal, the transponder 20 sends back a second ultrasonic wave W2 from the ultrasonic transmitter device 21. The second ultrasonic wave W2 is received at the ultrasonic receiver device 12 (the two ultrasonic receivers 12a and 12b) of the autonomous mobile unit 1. The incoming direction of the second ultrasonic wave W2 is estimated from the difference in the received signals at the two ultrasonic receivers 12a and 12b. In addition, the distance between the tracking device 10 and the transponder 20 is estimated from the time it takes from the transmission of the first ultrasonic wave W1 to the reception of the second ultrasonic wave W2. Using the reception information of the second ultrasonic wave, the relative position of the transponder 20 with respect to the tracking device 10 is determined.

As illustrated in FIG. 1, the ultrasonic waves propagate through the direct path 8 as well as through the reflection paths 9a and 9b. In the tracking system of the present invention, estimation of the relative position of the transponder 20 is carried out utilizing the direct wave and the reflected wave.

Figure 3:
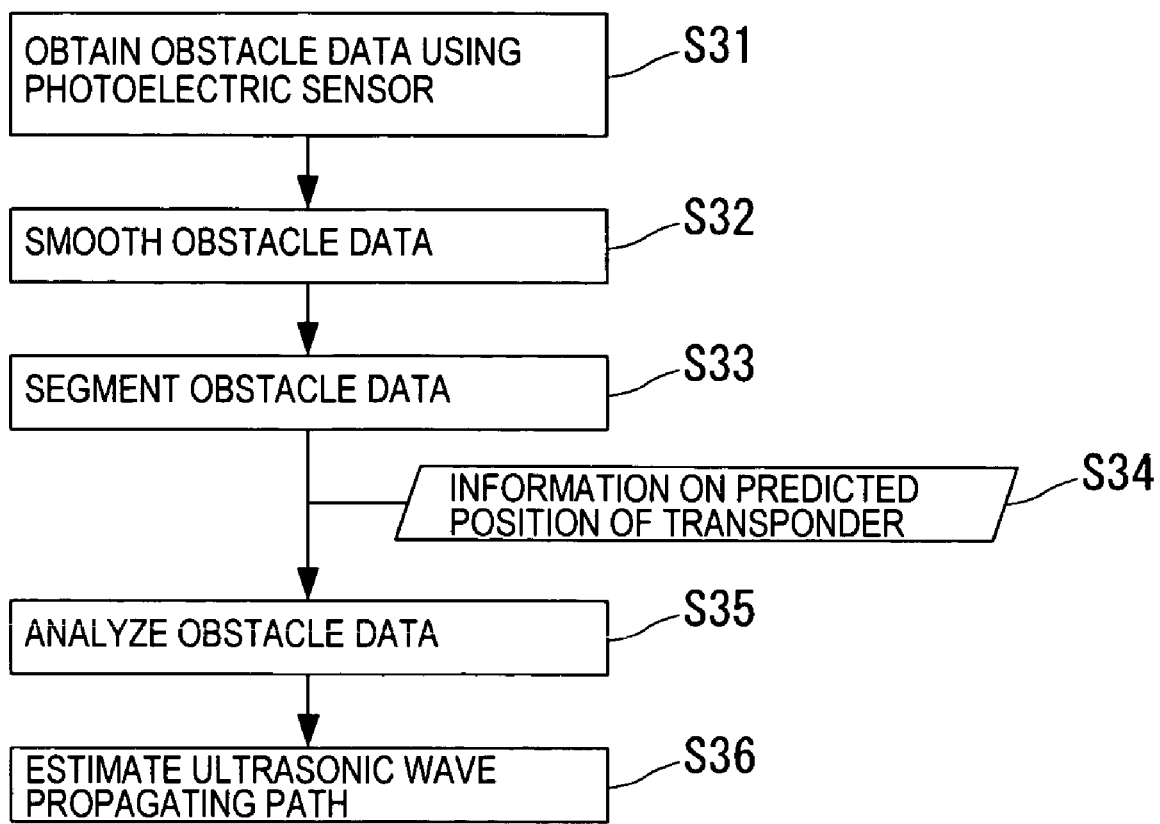
FIG. 3 is a flowchart illustrating a method of estimating an ultrasonic wave propagating path in one example of the tracking system of the present invention.

Hereinbelow, a method of estimating a position of the transponder 20 is described. First, the process flow for estimating the ultrasonic wave propagation path between the tracking device 10 and the transponder 20 is described with reference to the flowchart of FIG. 3.

First, using the photoelectric sensor 13, obstacles existing around the autonomous mobile unit 1 (the tracking device 10) and the moving object 2 (the transponder 20) are detected to obtain obstacle data (S31). The photoelectric sensor scans a predetermined angle range (for example, about 90° to 150°) that centers on the traveling direction of the autonomous mobile unit 1. A measurement region 5 of the photoelectric sensor 13 is shown in FIG. 1.

Figure 4:
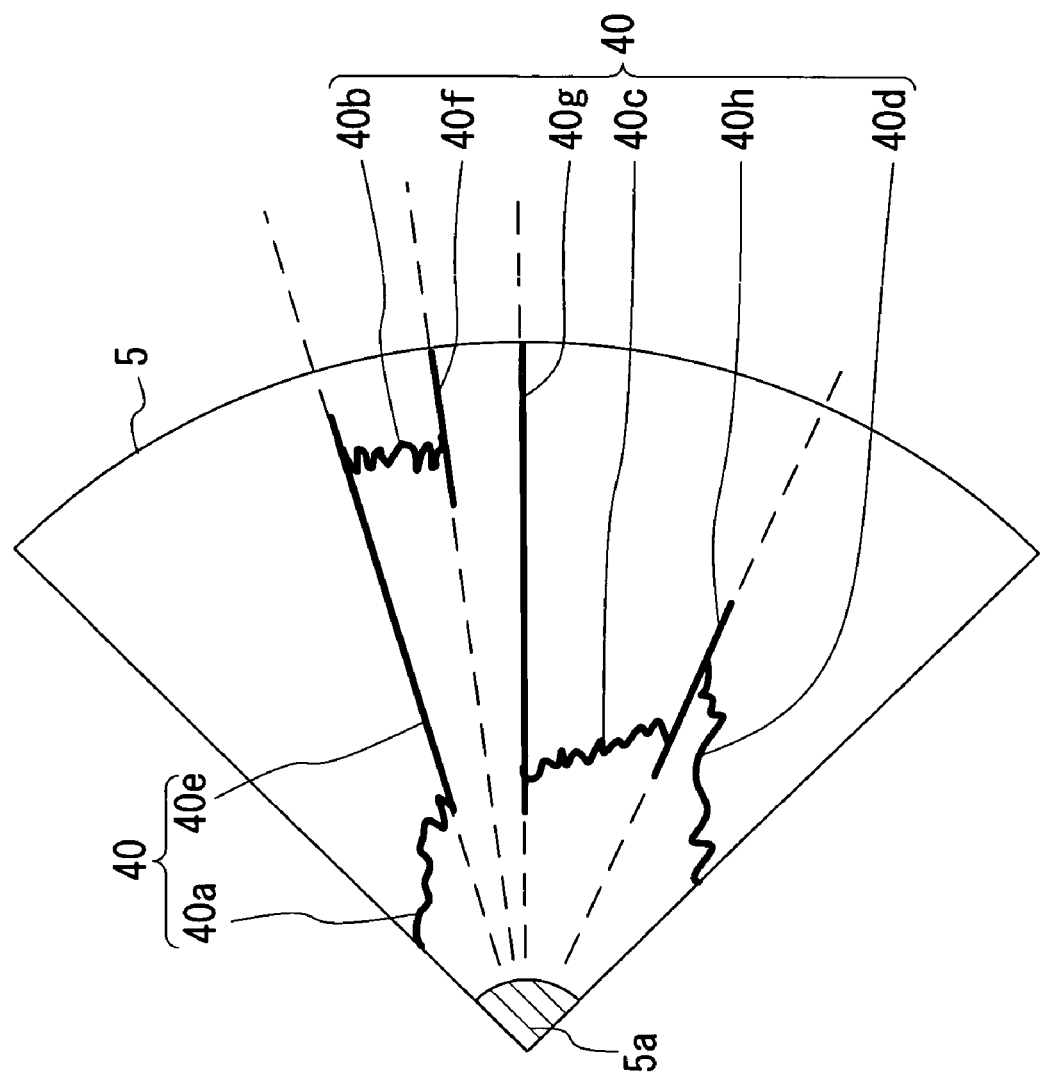
FIG. 4 illustrating one example of obstacle data obtained in the situation shown in FIG. 1 and the state of the segmentation.

The obstacle data 40 that is obtained under the situation in FIG. 1 are indicated by the bold line in FIG. 4. The length from the tracking device 10 to the obstacle data 40 corresponds to the distance from the tracking device 10 to the obstacle. It should be noted that a dead band 5a (hatched in FIG. 4) exists in the measurement region 5 of the photoelectric sensor. The obtained obstacle data is subjected to smoothing in order to remove irregularities in the data due to environmental noise or the like (S32 in FIG. 3).

Next, the obstacle data is divided (segmented) taking the continuity of the smoothed obstacle data 40 into consideration (S33). Specifically, the obstacle data 40 is divided at the points at which the continuity of the obstacle data 40 is broken, and thus, obstacle data 40a, 40b, 40c, and 40d are separated as shown in FIG. 4.

Referring to FIG. 1, the obstacle data 40a corresponds to the wall 6a, the obstacle data 40b corresponds to the wall 6c, and the obstacle data 40d corresponds to the wall 6b. Obstacle data 40e to 40h, which exist between the obstacle data 40a to 40d and extend linearly in radial directions, indicate discontinuity of the obstacles. For example, the obstacle data 40e occurs because the detected data for the wall 6a and the detected data for the wall 6c, which is away from the wall 6a, are adjacent to each other. The obstacle data in such a portion is radially discontinuous. That is because the photoelectric sensor scans a sector-shaped region with a probe beam for detecting obstacles. Accordingly, obstacle data are divided (segmented) from the obstacle data 40 along the directions of the obstacle data 40e to 40h extending linearly in radial directions (broken lines in the drawing). Since the measured obstacle data 40 has unevenness in the data due to the effect of environmental noise or the like, the obstacle data 40 is smoothed by averaging process or the like, and thereafter, the segmentation is performed. It should be noted that the smoothing may be carried out after the segmentation is performed.

Figure 5:
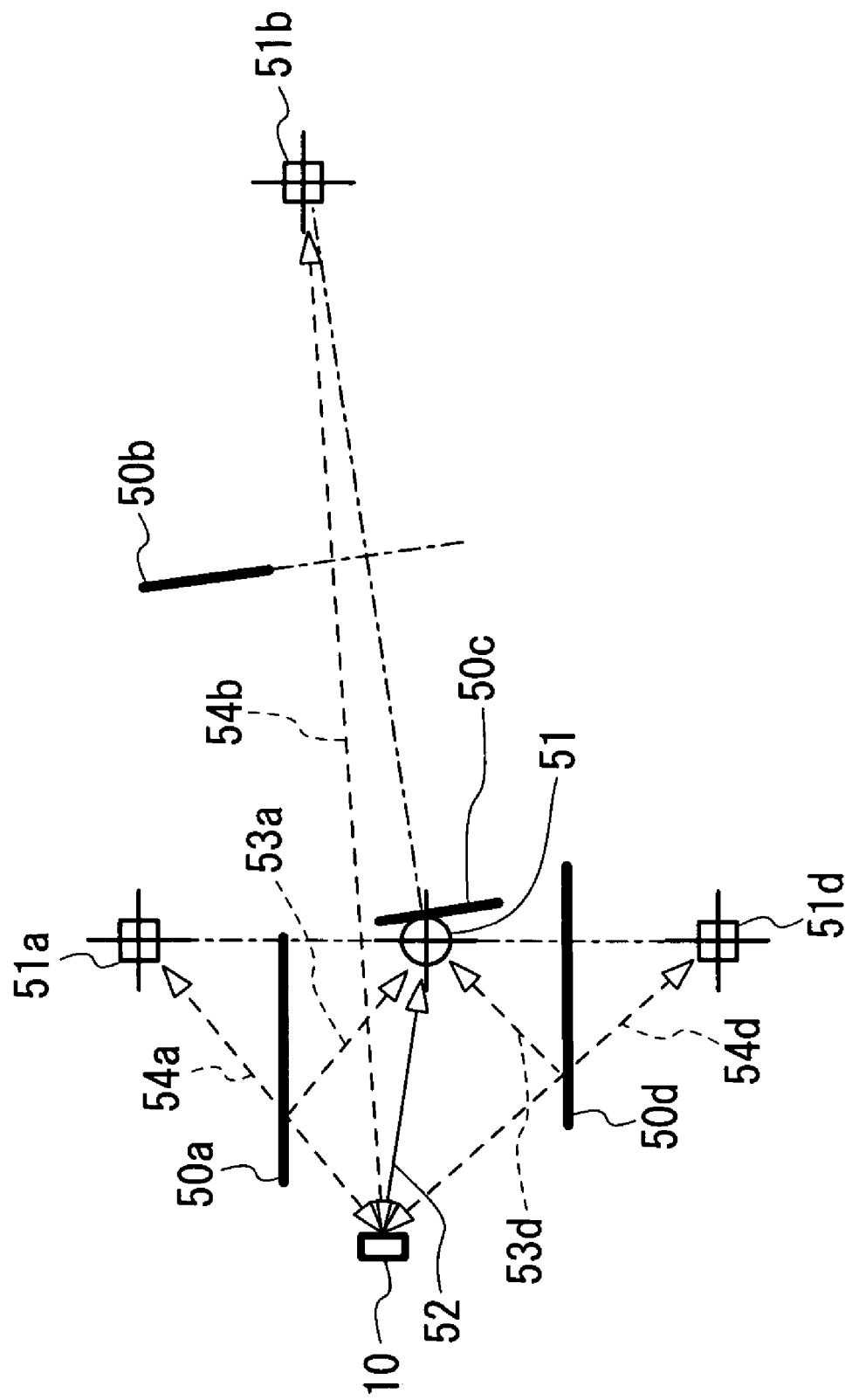
FIG. 5 illustrates one example of estimated path and mirror images generated in the situation shown in FIG. 1.

The obstacle data after the smoothing and the segmentation (hereinafter also referred to as an "obstacle data 50") is illustrated in FIG. 5. The obstacle data 50a to 50d correspond to the obstacle data 40a to 40d in FIG. 4, respectively.

Next, the obstacle data 50a to 50d are analyzed (S35). First, the segments that can be decided as obstacles are selected among the obstacle data 50. Next, which of the obstacle data applies to the moving object 2 is determined using information S34 on a predicted position of the transponder 20 and the obstacle data 50. At this time, the position of the transponder 20 that has been estimated in the most recent tracking cycle is utilized as the predicted position information S34 that indicates a predicted position 51 of the transponder 20. In the data shown in FIG. 5, the predicted position 51 and the obstacle data 50c are adjacent to each other, and therefore, it is decided that the data 50c is that of the moving object 2. Likewise, the obstacle data 50a, 50b, and 50d are decided to be those of the obstacles (wall surfaces) that reflect ultrasonic waves.

Thus, reflection environment information relating to the arrangement of the wall surfaces existing around the autonomous mobile unit 1 and the moving object 2 can be obtained in the step of analyzing obstacle data (S35).

Next, ultrasonic wave propagation paths are estimated (S36). Here, path estimation data are obtained, which include estimation data of a direct path in the case that the ultrasonic wave directly arrives at the tracking device 10 from the transponder 20, and estimation data of a reflection path in the case that the ultrasonic wave arrives at the tracking device 10 by being reflected by a wall surface.

The direct path can be estimated from the predicted position 51 of the transponder 20 with respect to the tracking device 10. On the other hand, the estimation of the reflection path is carried out using the predicted position 51 of the transponder 20 and the reflection environment information.

The method of estimating the reflection path is described with reference to FIG. 5. First, positions of mirror images of the predicted position 51 that have the obstacle data 50*a*, 50*b*, and 50*d*, indicating wall surfaces, as their planes of symmetry (axes of symmetry) are calculated. Mirror images 51*a*, 51*b*, and 51*d* are the mirror images that have the obstacle data 50*a*, 50*b*, and 50*d* as their axes of symmetry, respectively. For example, the predicted position 51 and the mirror image 51*a* exist at symmetrical positions having the obstacle data 50*a*, which corresponds to the wall 6*a* in FIG. 1, as the axis of symmetry.

The second ultrasonic wave transmitted from the transponder 20 travels the direct path 52, and is received by the tracking device 10 (by each of the ultrasonic receivers, specifically). The second ultrasonic wave also travels a reflection path 53*a* via the wall 6*a* (the obstacle data 50*a*), and is received by the tracking device 10. Here, the ultrasonic wave traveling a reflection path 53*a* is apparently determined to be the ultrasonic wave traveling a virtual path 54*a* connecting the mirror image 51*a* and the tracking device 10. Accordingly, estimating the virtual path 54*a* connecting the mirror image 51*a* and the tracking device 10 by calculating the position of the mirror image 51*a* yields the same result as that obtained by estimating the reflection path 53*a*. Likewise, a virtual path 54*d* connecting the mirror image 51*d* and the tracking device 10 is estimated. Also likewise, a virtual path 54*b* connecting the mirror image 51*b* and the tracking device 10 is estimated. No reflection path corresponding to a path 54*b* is formed, however, because the path 54*b* and the obstacle data 50*b* (line segment) do not intersect each other.

Thus, reflection paths are estimated by generating a mirror image for a predicted position of the transponder 20 having, as the plane of symmetry, an obstacle data decided to be an obstacles (wall surface), and assuming a virtual linear path connecting the mirror image and the tracking device 10. In other words, the tracking device 10 estimates the direct path(s) and the reflection path(s) using the information on the transponder's predicted position and the reflection environment information.

It should be noted that although the foregoing description assumes flat reflectors (obstacles), the reflectors may have curved surfaces or unevenness in actual use conditions. If a reflector has a curved surface having a large smooth curvature, each segment may be further divided into several segments so that they are approximated by linear lines, and a mirror image may be calculated for each of the approximate line segments. The obstacles with a small curvature or with continuous surface unevenness that is approximately greater than the wavelength are not selected as reflectors since they show poor stability as a reflector for ultrasonic wave. These settings may be determined taking into consideration the use environment of the tracking system, the frequency of the ultrasonic wave used, and the like.

Figure 6:
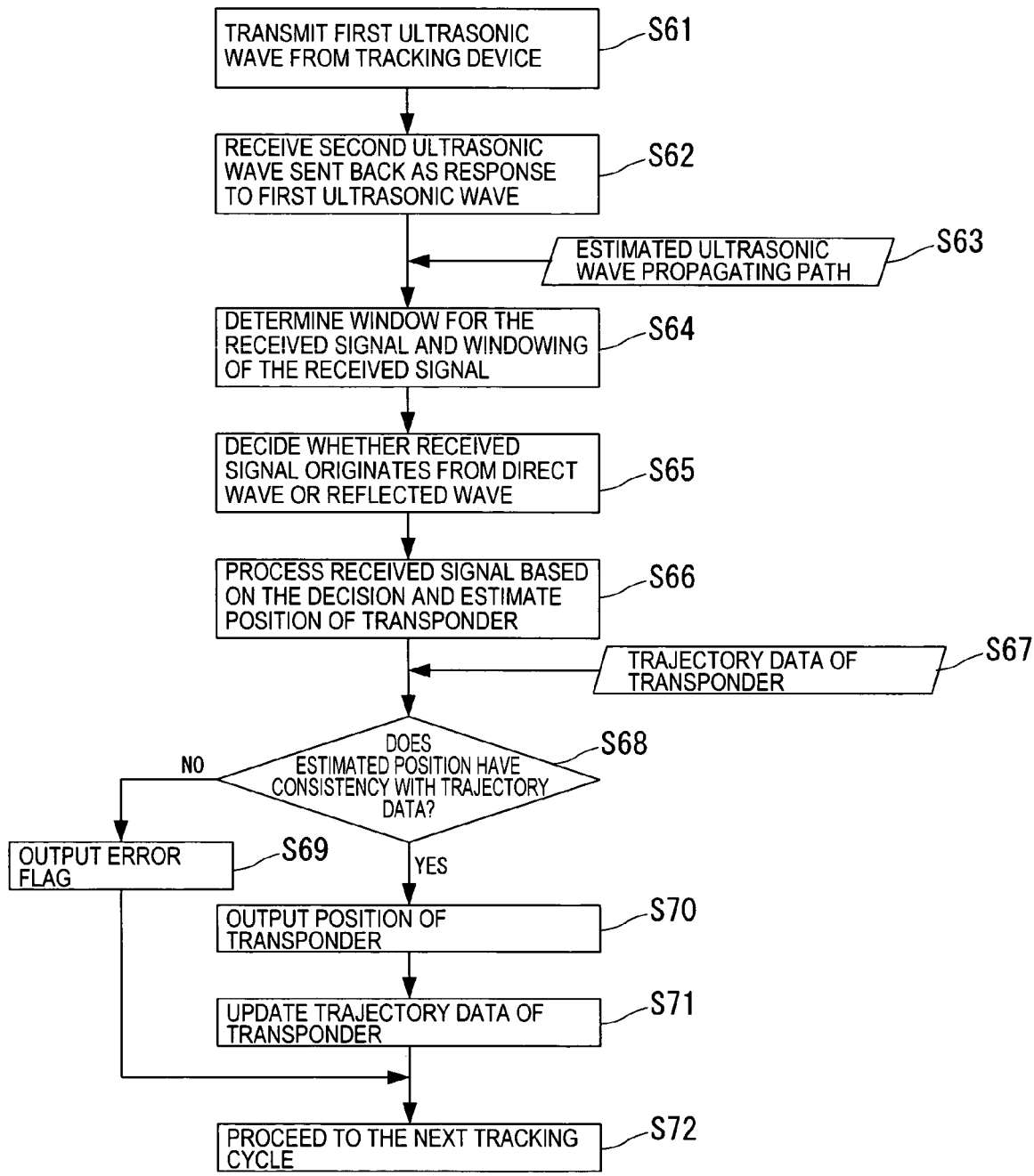
FIG. 6 is a flowchart illustrating a method of estimating a relative position of the transponder in one example of the tracking system of the present invention.

Thus, the reflection environment information is acquired using a photoelectric sensor, and the ultrasonic wave propagation paths are estimated. Meanwhile, ultrasonic waves are transmitted and received between the tracking device 10 and the transponder 20, to acquire reception information of the second ultrasonic wave that is transmitted from the transponder 20 and received by the tracking device 10. The acquisition of the reflection environment information (and the estimation of the propagation paths) and the transmitting and receiving of ultrasonic waves may be carried out simultaneously, or one of them may be carried out prior to the other. Using the reflection environment information (propagation paths) and the reception information thus obtained, the position of the transponder 20 is estimated. The process flow for estimating the position of the transponder 20 is illustrated in FIG. 6.

First, the tracking device 10 transmits the first ultrasonic wave (S61). The transponder 20 transmits the second ultrasonic wave using the first ultrasonic wave as a trigger signal. This second ultrasonic wave is received by the tracking device 10 (S62).

Next, determining windows of the received signal and windowing of the received signal are performed (S64). At this time, the estimation data relating to ultrasonic wave propagation paths, which is estimated concurrently with, or before or after the transmitting and receiving of the ultrasonic wave according to the above-described method, is used (S63). Herein, the term "window of the received signal" means a region of the signal of the second ultrasonic wave received by the tracking device 10 that is utilized for estimating the position of the transponder 20 (reception time period).

Figure 7:
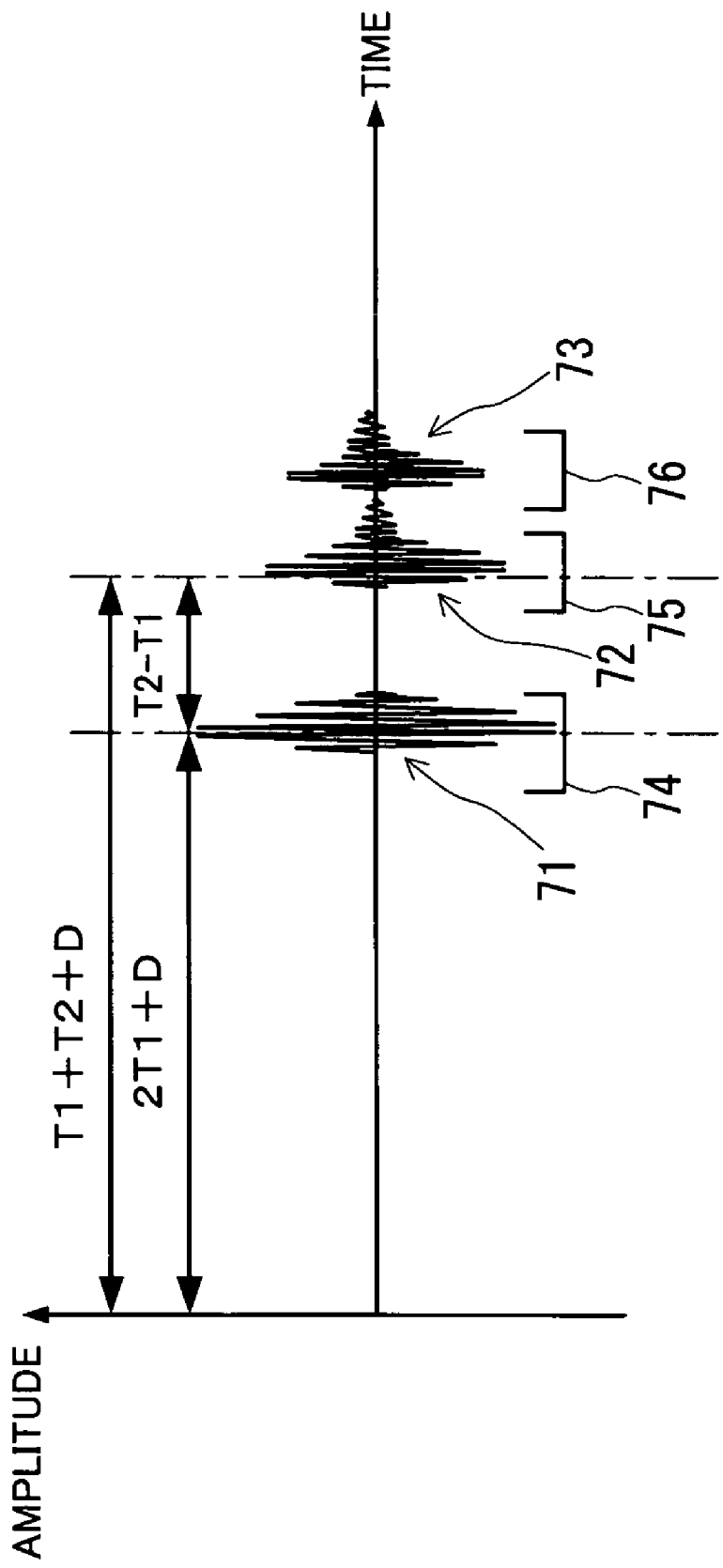
FIG. 7 illustrates the relationship between a window and a waveform of the second ultrasonic wave received in the situation shown in FIG. 1.

In the following, a method of determining the windows is described. FIG. 7 illustrates the received waveform of the second ultrasonic wave in the situation shown in FIG. 1 (the situation shown in FIG. 5). The second ultrasonic wave is received in the forms of waveforms 71, 72, and 73. The waveform 71 corresponds to the ultrasonic wave that has taken the direct path 8 in FIG. 1 for both the outgoing path and the incoming path (corresponding to the direct path 52). The waveform 72 is a waveform that is obtained when the outgoing path takes the direct path 8 and the incoming path takes the reflection path 9*a* (corresponding to the reflection path 53*a*). The waveform 73 is a waveform that is obtained when the outgoing path is the direct path 8 and the incoming path is the reflection path 9*b* (corresponding to the reflection path 53*d*). It should be noted that the reflection path 9*a* is assumed to be shorter than the reflection path 9*b* in FIG. 1.

The waveform 71 is received near an elapsed time [2T1+D] on the time axis. Time T1 is a one-way propagation time of ultrasonic wave in the direct path 52, and time D is a time including a delay time in the transponder and a processing time in the circuit system. The arrival time of the waveform 72 is [T1+T2+D]. Time T2 is a one-way propagation time of ultrasonic wave in the reflection path 53*a* (corresponding to the path 54*a*). Since these paths are estimated in advance, the reception of a signal can be estimated by determining the time D in advance.

Windows (reception time periods) 74 to 76 for windowing the received data are set so that these waveforms 71 to 73 can be windowed individually. By windowing the received data using the set windows, sudden signal contamination by environmental electromagnetic noise or the like is eliminated as much as possible and measurement accuracy can be ensured. In the present invention, a window for the case in which both the outgoing path and the incoming path take a reflection path may also be set in addition to the windows 74 to 76. This window will be discussed later with reference to FIG. 11.

A data window is determined corresponding to the arrival time of the ultrasonic wave that is estimated from the path estimation data. Here, a margin is set taking into consideration the distance that the transponder 20 travels during the period from the previous tracking cycle to the next tracking cycle. It should be noted that a predicted position may be estimated taking into consideration of the trajectory of the transponder 20 that has been obtained up to the previous measurement, and based on the predicted position, a window may be determined.

According to the windows determined in this way, the received waveform is windowed (S64 in FIG. 6). Then, it is determined whether or not the response ultrasonic wave (the second ultrasonic wave) from the transponder 20 has been observed in this window period. According to the result, it is decided whether the waveform of the received second ultrasonic wave is that of the direct wave, which arrives through the direct path, or the reflected wave, which arrives through the reflection path from the transponder 20 (S65). For example, the waveform 71 received in the window 74 is determined to be a direct wave, while the waveform 72 received in the window 75 is determined to be a reflected wave.

When the second ultrasonic wave is observed in the windows 74 to 76, the length of the propagation path between the tracking device 10 and the transponder 20 is calculated from the reception time. In addition, by comparing the received signals in the two ultrasonic receivers, the direction of the propagation path is calculated. From these calculated values, a transmission position of the second ultrasonic wave is estimated.

Using these results and the result of the foregoing decision, the relative position (distance and orientation) of the transponder 20 relative to the tracking device 10 is estimated (S66). Specifically, if the second ultrasonic wave is decided to be the direct wave, the transmission position of the second ultrasonic wave that has been calculated from the reception information is estimated to be the position of the transponder 20. On the other hand, if the second ultrasonic wave is decided to be the reflected wave, a position symmetrical to the "calculated transmission position" regarding the obstacle data for the obstacle that has reflected the reflected wave is estimated to be the position of the transponder 20.

Next, by comparing the estimated relative position of the transponder 20 with the trajectory data of the movement of the transponder 20 that has been accumulated by the past measurement (S67), it is decided whether or not the estimated relative position has consistency with the trajectory data of the transponder 20 (S68). Here, whether or not they have consistency is decided taking the maximum traveling speed of the transponder 20 (the moving object 2) into consideration.

If they have no consistency with each other, an error flag is output (S69), and the process proceeds to the next tracking cycle (S72). On the other hand, if they have consistency, the estimated relative position of the transponder 20 is output as the position of the transponder 20 at the time of the measurement (S70). The position that has been output is utilized in the next tracking cycle as predicted position information.

Next, the trajectory data of the transponder 20 is updated (S71), and the process proceeds to the next tracking cycle (S72). In the next measurement cycle, the acquisition of the reflection environment information using the photoelectric sensor, the estimation of the ultrasonic wave propagation paths, and the estimation of the relative position of the transponder 20 by transmitting and receiving ultrasonic waves are performed again.

The autonomous mobile unit 1 controls an automotive device based on the relative position of the transponder 20 that has been output to track the transponder 20 (the moving object 2). Although the automotive device is not particularly limited, the automotive device is provided with, for example, a driving mechanism, such as an engine or a motor, and wheels driven by the driving mechanism.

Figure 8:
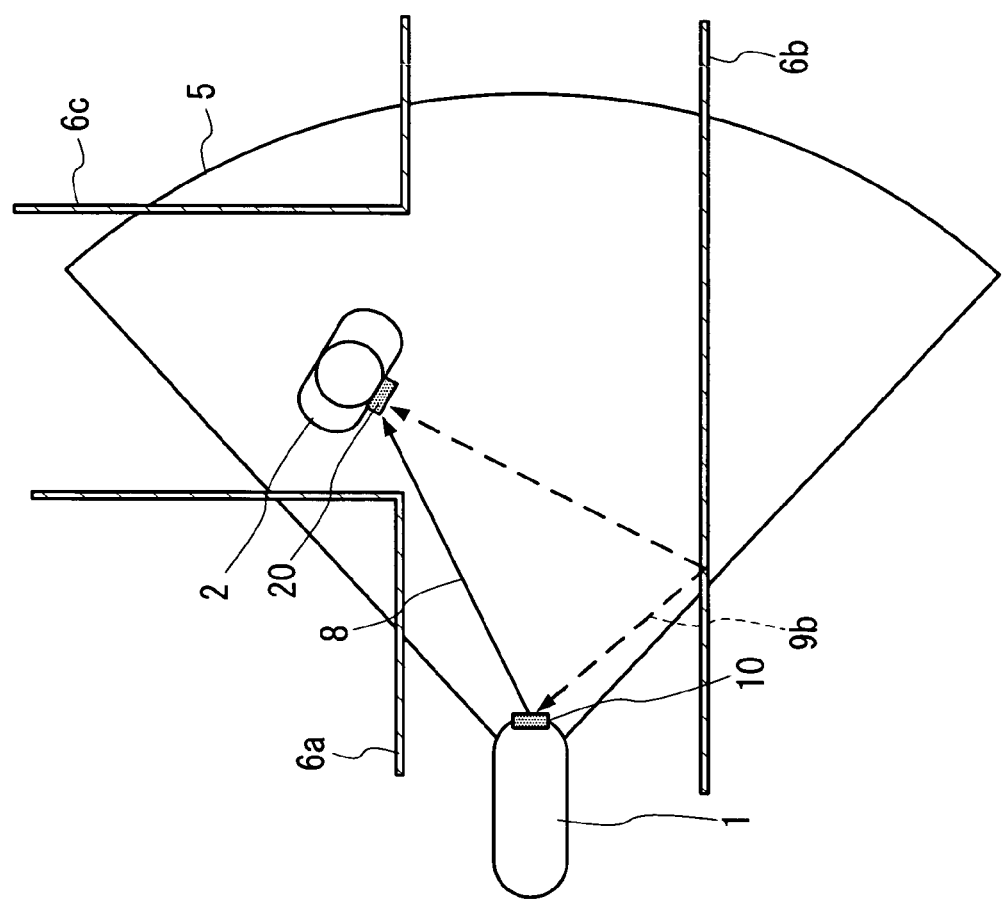
FIG. 8 illustrates another example of tracking situations in the tracking system of the present invention.

In this way, the autonomous mobile unit 1 tracks the moving object 2. Next, a case is considered in which the moving object 2 has moved from the state shown in FIG. 1. FIG. 8 illustrates the state in which the moving object 2 has moved in the direction of the side passage 3. In the state shown in FIG. 8, the linear path 8 connecting the tracking device 10 and the transponder 20 has not yet blocked by a wall. The reflection path 9b originating from the wall 6b also exists.

Figure 9:
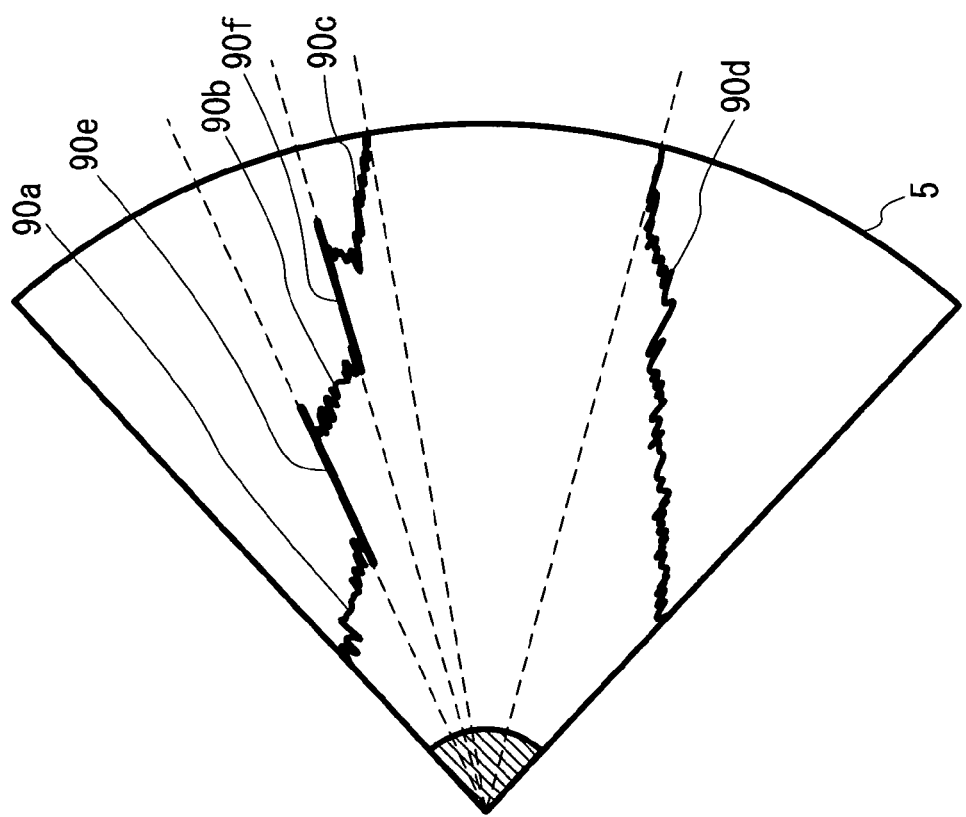
FIG. 9 illustrates one example regarding obstacle data obtained in the situation shown in FIG. 8 and the state of the segmentation.

FIG. 9 schematically illustrates the obstacle data and the result of segmentation in the situation shown in FIG. 8. The obstacle data are divided into obstacle data 90a, 90b, 90c, and 90d, which are recognized as reflectors, and obstacle data 90e and 90f, which are recognized as discontinuous portions. As shown in FIG. 9, segmentation is carried out even for the portions in which no obstacle data exists.

Figure 10:
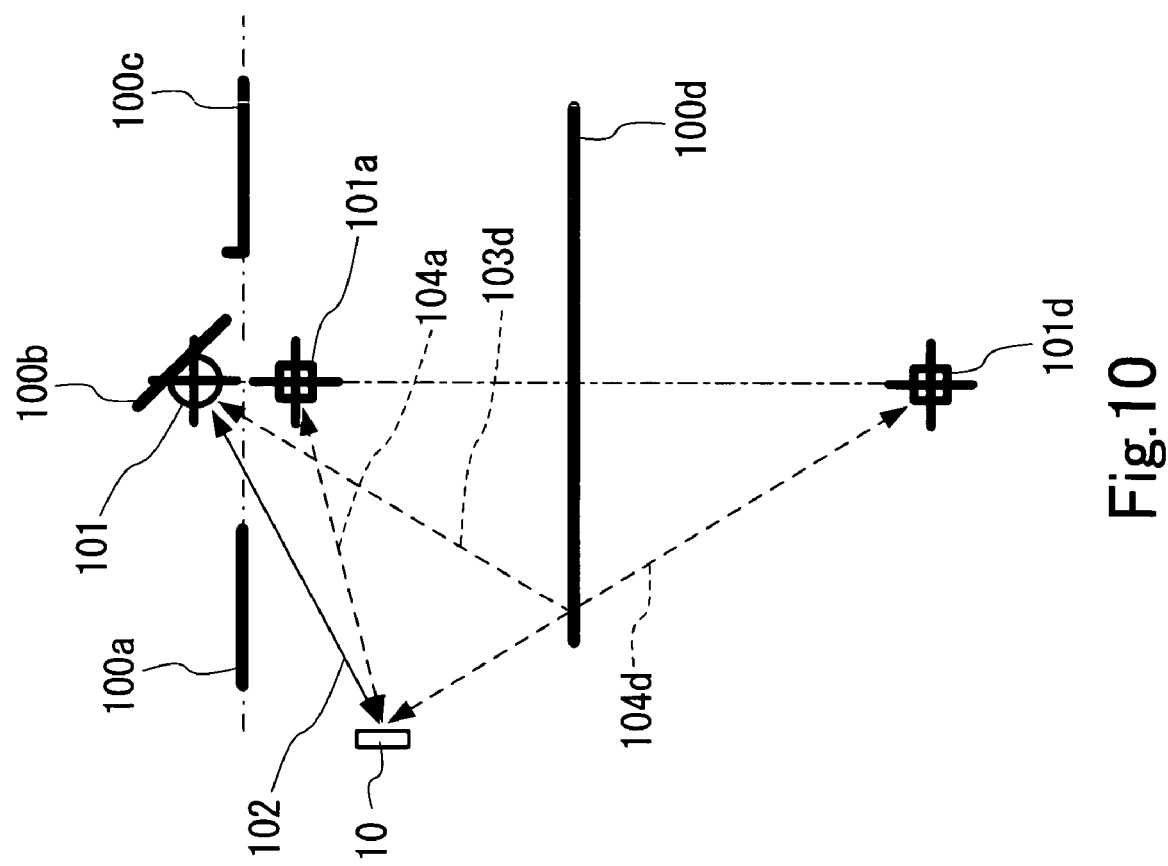
FIG. 10 illustrates one example of estimated paths and mirror images generated in the situation shown in FIG. 8.

FIG. 10 illustrates the obstacle data, mirror images, and ultrasonic wave propagation paths in the situation shown in FIG. 8 after the smoothing and the selection. Obstacle data 100a to 100d correspond to the obstacle data 90a to 90d, respectively. Also, the obstacle data 100a, 100c, and 100d correspond to the walls 6a, 6c, and 6b, respectively. The obstacle data 100b corresponds to the moving object 2. A predicted position 101 is the relative position of the transponder 20 that has been determined in the most recent tracking cycle. A mirror image 101a is the mirror image of the predicted position 101 regarding the obstacle data 100a and 100c (walls 6a and 6c). A mirror image 101d is the mirror image of the predicted position 101 regarding the obstacle data 100d (wall 6b).

Using these pieces of information, a direct path 102 connecting the tracking device 10 and the transponder 20, and paths 104a and 104d respectively connecting the tracking device 10 to the mirror image 101a and to the mirror image 101d, are calculated. The path 104d is a virtual path corresponding to a reflection path 103d. It should be noted that since the path 104a connecting the tracking device 10 and the mirror image 101a does not intersect the obstacle data 100a and 100c, no reflection path exists therebetween; accordingly, no window is set for the corresponding path.

Figure 11:
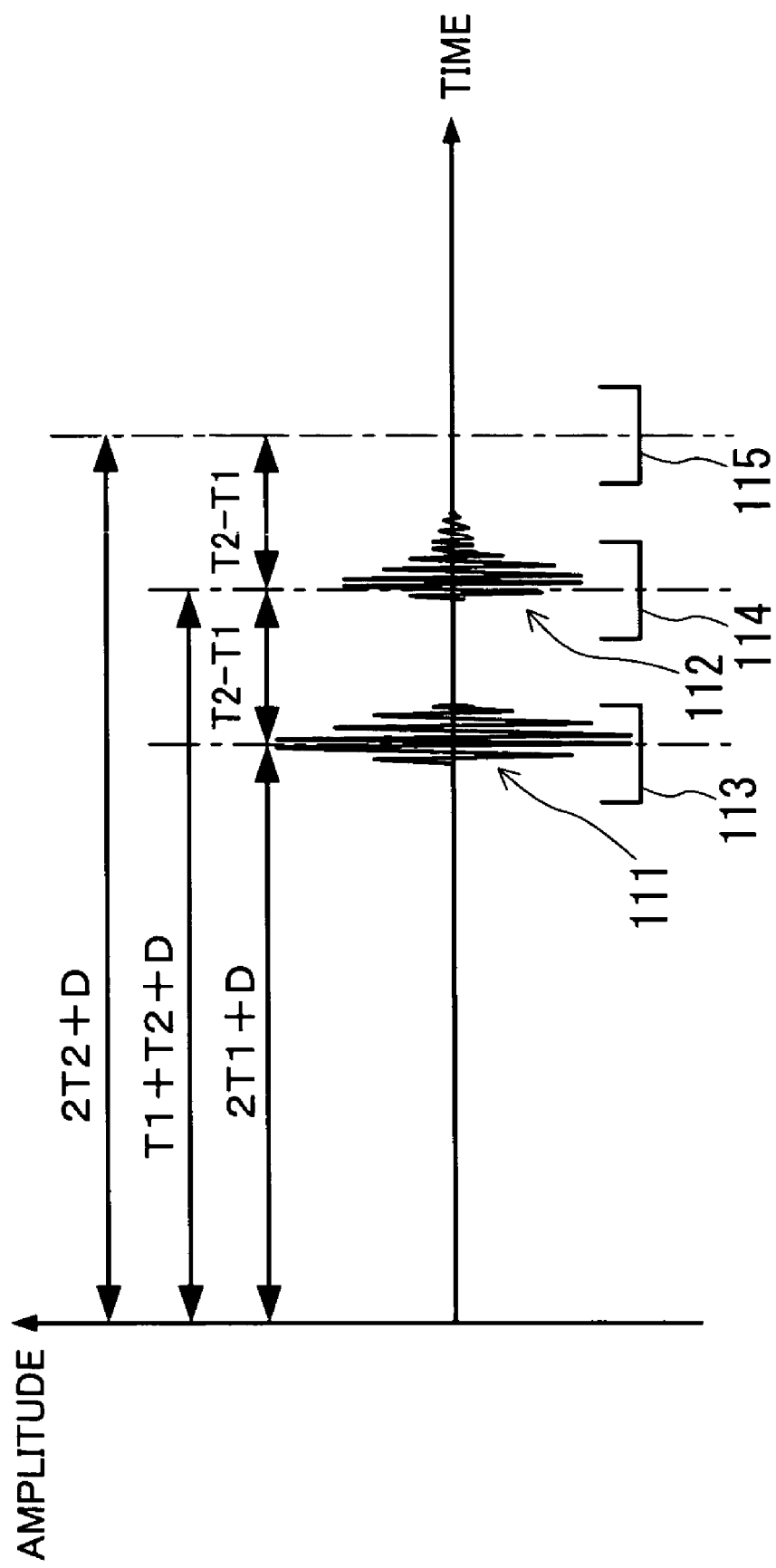
FIG. 11 illustrates the relationship between windows and the waveform of the second ultrasonic wave received in the situation shown in FIG. 8.

FIG. 11 illustrates received data of the ultrasonic wave in the situation shown in FIG. 8. FIG. 11 also shows the windows that are set when the transponder 20 is at the position shown in FIG. 8. A waveform 111 in FIG. 11 is a waveform in the case that both the outgoing path and the incoming path take a direct path. A waveform 112 is a waveform in the case that the outgoing path takes a direct path while the incoming path takes a reflection path (corresponding to the path 104d).

A window 113 is set to have a duration [2T1+D±M] ([2T1+D−M] to [2T1+D+M]) using the time of transmission of the first ultrasonic wave as a reference so that the waveform 111 can be windowed. Here, time T1 is a one-way propagation time of ultrasonic wave in the direct path 102. Time D is a time including the delay time in the transponder and the processing time in the circuit system, and it represents the total of time delays. Time M is a margin for making up the time lag due to movement of the transponder 20. The time for margin may be different between before and after the time [2T1+D]. A window 114 corresponds to the waveform 112, and is set to have a duration [T1+T2+D±M]. T2 is a one-way propagation time of ultrasonic wave in the path 104d.

A window 115 corresponds to the case that both the outgoing path and the incoming path take a reflection path, and is set to have a duration [2T2+D±M]. When the moving object 2 does not move from the position shown in FIG. 8, the second ultrasonic wave is not received in the window 115.

Figure 12:
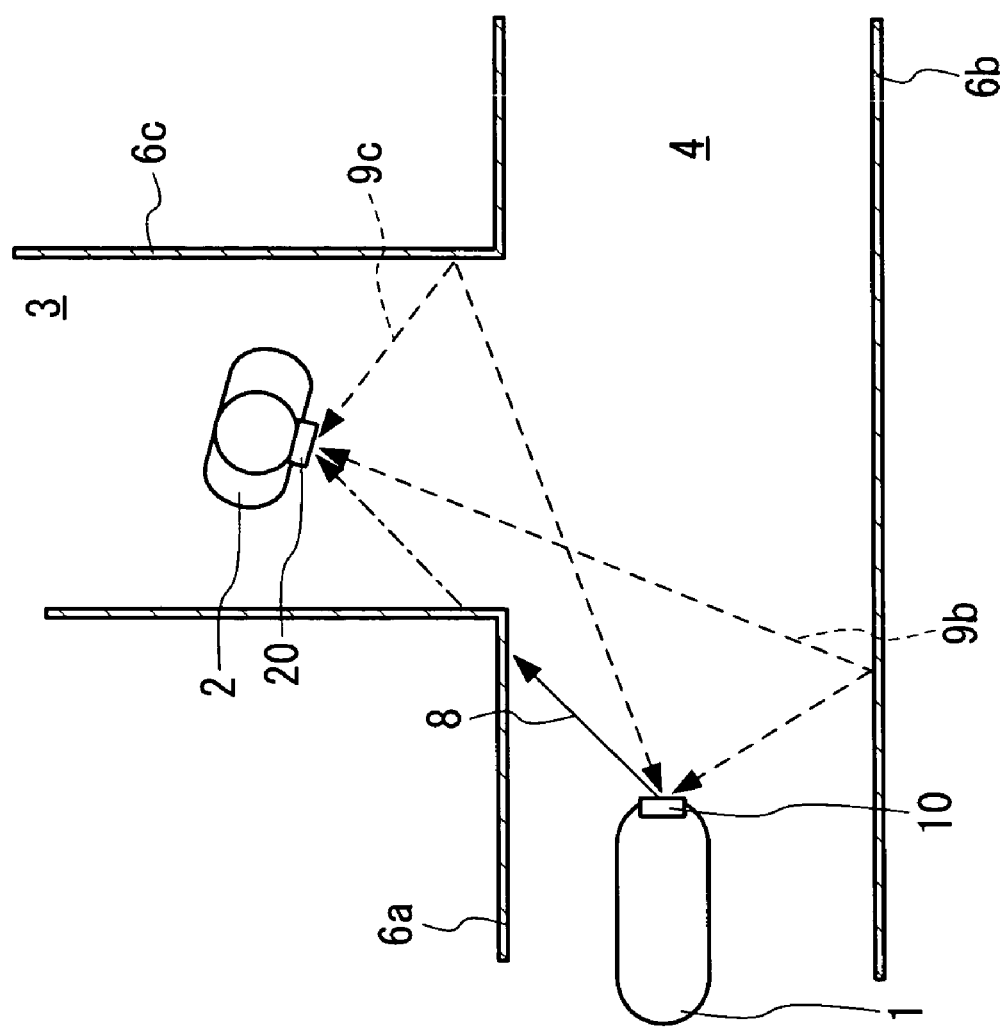
FIG. 12 illustrates another example of tracking situations in the tracking system of the present invention.

Next, FIG. 12 illustrates the state in which the moving object 2 proceeds to the side passage 3, whereby the linear path 8 between the tracking device 10 and the transponder 20 is blocked by the wall 6a. In this case, although the linear path 8 is blocked, ultrasonic waves propagate through the reflection paths 9b and 9c. It should be noted that the reflection path 9b is assumed to be shorter than the reflection path 9c.

Figure 13:
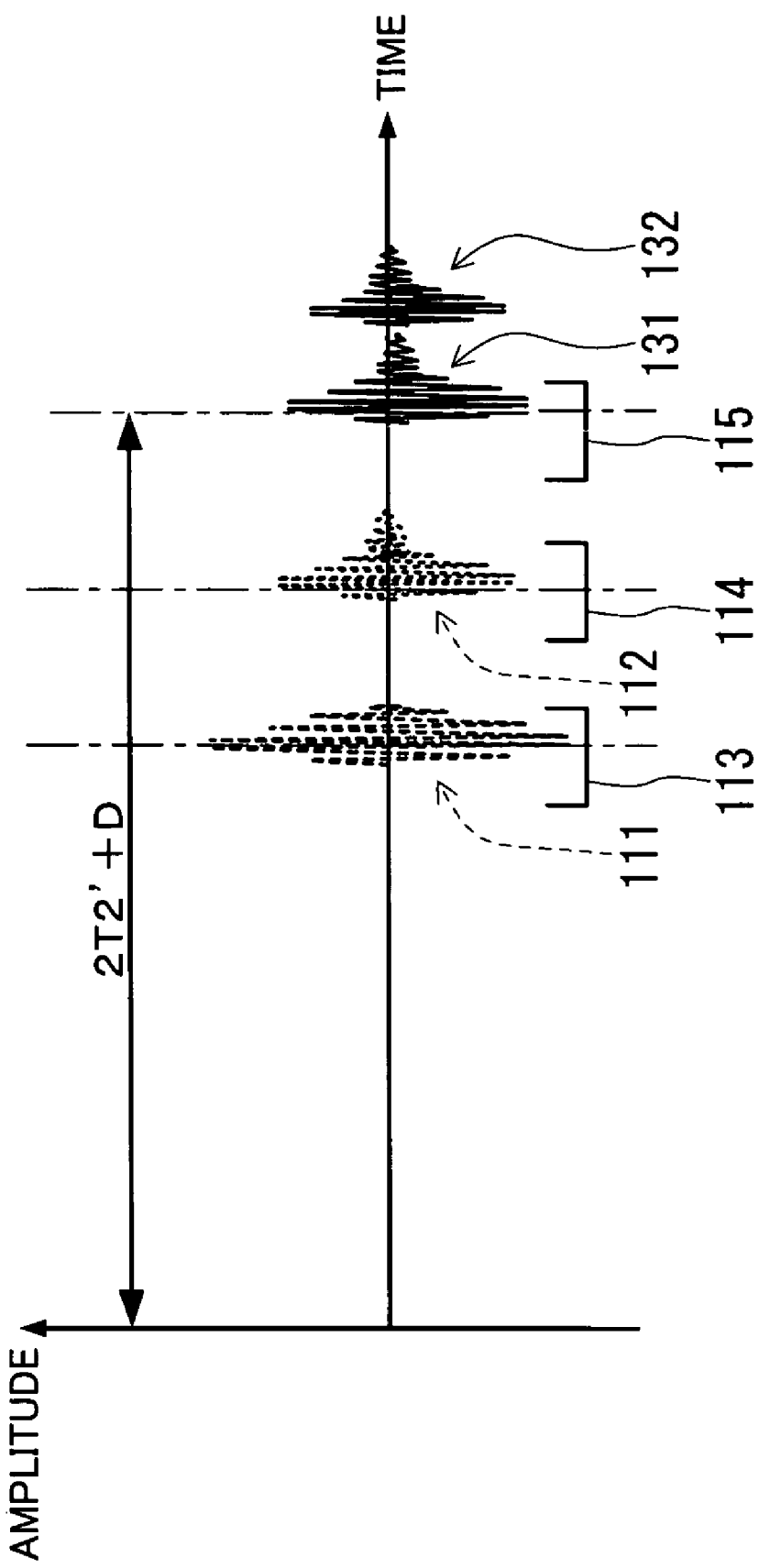
FIG. 13 illustrates the relationship between windows and the second ultrasonic wave received in the situation shown in FIG. 12.

A case is assumed in which measurement is performed in the state shown in FIG. 8 and thereafter the state shown in FIG. 12 is entered. In this case, the windows 113 to 115 of FIG. 11 are set based on the position of the transponder 20 that is estimated in the state shown in FIG. 8. FIG. 13 illustrates a waveform of the second ultrasonic wave received by the tracking device 10 in the situation shown in FIG. 12. In FIG. 13, the waveforms 111 and 112 shown by dotted lines indicate the waveforms that were not received.

The first ultrasonic wave transmitted from the tracking device 10 passes through the shortest reflection path 9b and reaches the transponder 20. Triggered by reception of this ultrasonic wave, the transponder 20 transmits the second ultrasonic wave. The second ultrasonic wave passes through the shorter reflection path 9b or the longer reflection path 9c and reaches the tracking device 10. A waveform 131 in FIG. 13 is a signal of the second ultrasonic wave that propagates through the reflection path 9b, and a waveform 132 is a signal of the second ultrasonic wave that propagates through the reflection path 9c. The waveform 131 is observed after time [2T2'+D] has elapsed after the transmission of the first ultrasonic wave. Here, T2' is a one-way propagation time of ultrasonic wave in the reflection path 9b.

Because the direct path 8 is blocked, no signal is received in the windows 113 and 114. Accordingly, the tracking device 10 monitors whether a signal is observed or not in the next window 115, and observes the waveform 131.

The signal observed in the window 115 is decided to be a signal that has propagated through the reflection path 9b for both its outgoing path and incoming path. Meanwhile, the tracking device 10 calculates the relative position of the transponder 20 from the propagation direction and the reception time of the received second ultrasonic wave. This relative position exists at the position of the mirror image of the actual transponder 20 with respect to the wall 6b. Thus, a position symmetrical to the "calculated relative position" with respect to the obstacle data 100d indicating the wall 6b is calculated to be the actual position of the transponder 20. For example, when the calculated relative position is at the position of the mirror image 101d, the actual position of the transponder 20 is estimated to be the predicted position 101. The actual position of the transponder 20 can be found by performing a reverse mirroring that is opposite the estimation for the reflection path. Thus, even when the direct path connecting the tracking device 10 and the transponder 20 is blocked, the position of the transponder 20 can be estimated and the tracking can be continued.

Figure 14:
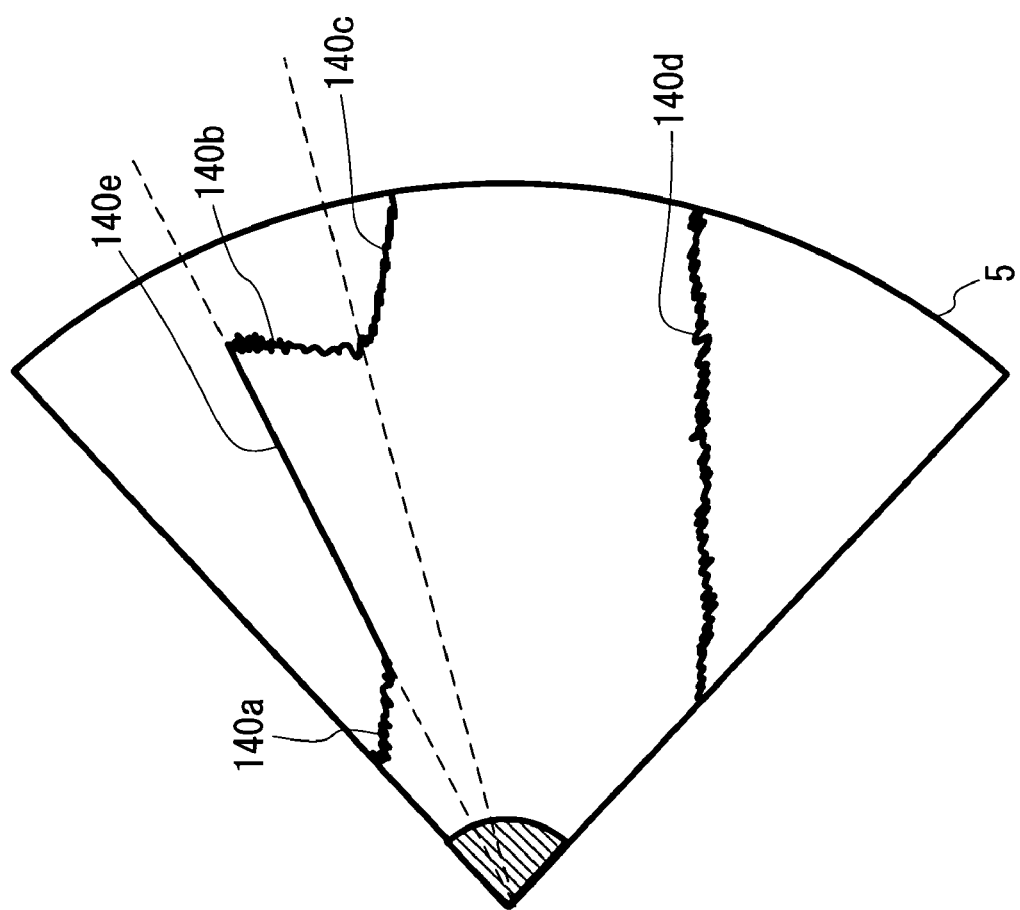
FIG. 14 illustrates one example of obstacle data obtained in the situation shown in FIG. 12 and the state of the segmentation.

The processing is executed likewise after the transponder 20 has entered the blind spot area behind the wall. FIG. 14 schematically illustrates obstacle data and the results of segmentation in the situation shown in FIG. 12. The obstacle data is divided into obstacle data 140a, 140b, 140c, and 140d, which are recognized as reflectors, and an obstacle data 140e, which is recognized as a discontinuous portion.

Figure 15:
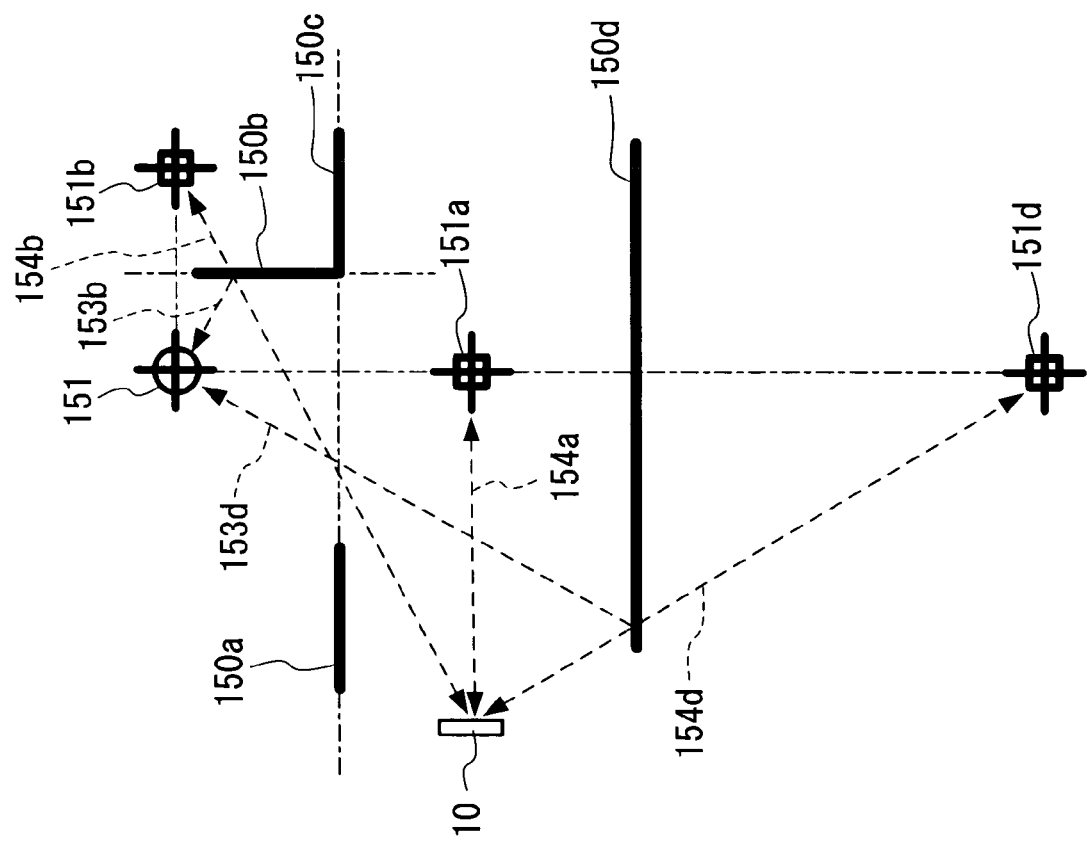
FIG. 15 illustrates one example of estimated paths and mirror images generated in the situation shown in FIG. 12.
Figure 16:
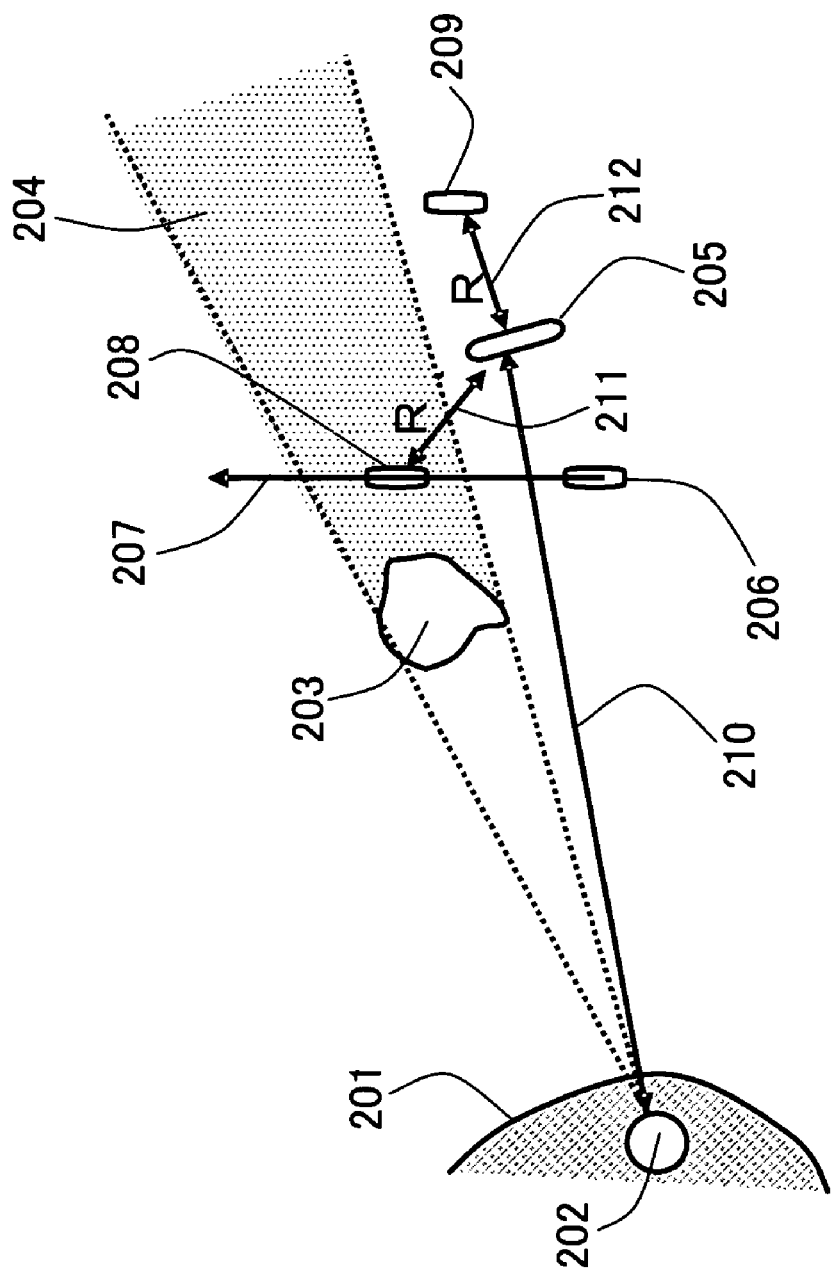
FIG. 16 schematically illustrates conventional technology that uses radar reflection for identifying the position of a target object.

FIG. 15 illustrates the data obtained by processing the data shown in FIG. 14. Obstacle data 150a to 150d correspond to the obstacle data 140a to 140d, respectively. The obstacle data 150a corresponds to the wall 6a, the obstacle data 150b and 150c correspond to the wall 6c, and the obstacle data 150d corresponds to the wall 6b. A predicted position 151 is the relative position of the transponder 20 that has been determined by the most recent estimation of relative position. A mirror image 151a is the mirror image of the predicted position 151 with respect to the obstacle data 150a (wall 6a). Likewise, a mirror image 151b is the mirror image of the predicted position 151 with respect to the obstacle data 150b (wall 6c). Also, a mirror image 151d is the mirror image of the predicted position 151 with respect to the obstacle data 150d (wall 6b).

Using these pieces of information, paths 154a, 154b, and 154d that correspond to reflection paths connecting the tracking device 10 and the transponder 20 are calculated. The paths 154b and 154d are the virtual paths that respectively correspond to the reflection paths 153b and 153d. It should be noted that since the path 154a connecting the tracking device 10 and the mirror image 151a does not intersect the obstacle data 150a, no reflection path exists therebetween.

Next, a window corresponding to a signal that takes a direct path for both the outgoing path and the incoming path, a window corresponding to a signal that takes a direct path for the outgoing path and a reflection path for the incoming path, and a window corresponding to a signal that takes a reflection path for both the outgoing path and the incoming path, are set. Then, by processing the reception information of the second ultrasonic wave in the same manner as in the process shown in FIG. 13, the position of the transponder 20 is estimated.

It should be noted that, although the foregoing description of the specific example has described a case in which the moving object goes behind a blind spot such as a corner, the present invention may also exhibit advantages in other situations. For example, the present invention is effective even in such a case that an obstacle that accompanies movements (such as another human) goes between the moving object and the autonomous mobile unit and thereby blocks the direct path.

Moreover, although the foregoing description of the specific example has discussed a case in which a photoelectric sensor is used as an obstacle detecting means, it is possible to employ an obstacle sensor using ultrasonic waves. In this case, the frequency of the ultrasonic wave of the obstacle sensor should be selected so as to be such a frequency that does not adversely affect the process of transmitting and receiving ultrasonic waves that is performed between the transponder and the tracking device for the estimation of relative position. For example, if an ultrasonic wave with a higher frequency than the ultrasonic wave used for the estimation of relative position is employed for detecting obstacles, the performance of obstacle detection will be high and the adverse effect on the estimation of relative positions will be small.

Furthermore, the foregoing description of the specific example has discussed a case in which windows are set based on estimated ultrasonic wave propagation paths and, using the windows, the signal of the second ultrasonic wave is separated into a signal originating from a direct wave and a signal originating from a reflected wave. However, it is also possible to separate the signal of the second ultrasonic wave by other methods. For example, it is possible to decide that the received signal is a signal propagating through a reflection path when a propagation path calculated from the signal of the received second ultrasonic wave intersects an obstacle data indicating a wall surface.

The present invention is applicable to a tracking system including a moving object and an autonomous mobile unit for tracking the moving object, and an autonomous mobile unit used therefor. The tracking system according to the present invention can adapt flexibly to changes in the surrounding environment and is therefore useful for, for example, transfer robots in indoor environments, such as railway stations and airports.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A tracking system comprising a transponder attached on a moving object, and an autonomous mobile unit for tracking the transponder:
    the autonomous mobile unit having a first ultrasonic transceiver device and an environment detecting means for acquiring reflection environment information relating to a wall surface existing around the autonomous mobile unit and the transponder, and
    the transponder having a second ultrasonic transceiver device, wherein:
    (i) the autonomous mobile unit transmits a first ultrasonic wave from the first ultrasonic transceiver device;
    (ii) the transponder receives the first ultrasonic wave at the second ultrasonic transceiver device and thereafter, triggered by reception of the first ultrasonic wave, transmits a second ultrasonic wave from the second ultrasonic transceiver device;
    (iii) the autonomous mobile unit acquires, by receiving the second ultrasonic wave at the first ultrasonic transceiver device, reception information relating to a direct wave that directly arrives at the first ultrasonic transceiver device from the second ultrasonic transceiver device, and relating to a reflected wave that arrives at the first ultrasonic transceiver device from the second ultrasonic transceiver device by being reflected by the wall surface; and
    (iv) the autonomous mobile unit makes a decision whether the received second ultrasonic wave is the direct wave or the reflected wave using the reception information and the reflection environment information, and estimates a position of the transponder by processing the reception information based on the decision, to track the transponder.

2. The tracking system according to claim 1, wherein, in the step (iv):
    if the received second ultrasonic wave is decided to be the direct wave, the autonomous mobile unit estimates a transmission position from which the second ultrasonic wave is transmitted, the transmission position being calculated from the reception information, to be the position of the transponder; and
    if the received second ultrasonic wave is decided to be the reflected wave, the autonomous mobile unit estimates a position symmetrical to the transmission position with respect to an obstacle data indicating the wall surface that has reflected the reflected wave to be the position of the transponder.

3. The tracking system according to claim 1, wherein:
    prior to the step (iv), the autonomous mobile unit estimates ultrasonic wave propagation paths including a direct path directly connecting the first ultrasonic transceiver device and the second ultrasonic transceiver device and a reflection path connecting the first ultrasonic transceiver device and the second ultrasonic transceiver device via the wall surface, using the reflection environment information and predicted position information relating to a predicted position of the transponder; and
    in the step (iv), the autonomous mobile unit executes the decision using the propagation paths and the reception information.

4. The tracking system according to claim 3, wherein, in the step (iv):
    the autonomous mobile unit calculates a first reception time period in which the second ultrasonic wave is anticipated to be received when the first and second ultrasonic waves propagate through the direct path, and a second reception time period in which the second ultrasonic wave is anticipated to be received when the first and second ultrasonic waves propagate through the reflection path; and
    the autonomous mobile unit decides that the second ultrasonic wave received in the first reception time period is the direct wave, and that the second ultrasonic wave received in the second reception period is the reflected wave.

5. The tracking system according to claim 4, wherein, in the step (iv):
    if the received second ultrasonic wave is decided to be the direct wave, the autonomous mobile unit estimates a transmission position from which the second ultrasonic wave is transmitted, the transmission position being calculated from the reception information, to be the position of the transponder; and
    if the received second ultrasonic wave is decided to be the reflected wave, the autonomous mobile unit estimates a position symmetrical to the transmission position with respect to an obstacle data indicating the wall surface that has reflected the reflected wave to be the position of the transponder.

6. The tracking system according to claim 3, wherein the predicted position information includes information relating to traveling speed of the moving object.

7. The tracking system according to claim 1, wherein, in the step (iv):
    the autonomous mobile unit calculates a propagation path of the second ultrasonic wave from the reception information; and
    if the propagation path does not intersect an obstacle data indicating the wall surface, the autonomous mobile unit decides that the received second ultrasonic wave is the direct wave; and
    if the propagation path intersects the obstacle data indicating the wall surface, the autonomous mobile unit decides that the received second ultrasonic wave is the reflected wave.

8. The tracking system according to claim 7, wherein, in the step (iv):
    if the received second ultrasonic wave is decided to be the direct wave, the autonomous mobile unit estimates a transmission position from which the second ultrasonic wave is transmitted, the transmission position being calculated from the reception information, to be the position of the transponder; and if the received second ultrasonic wave is decided to be the reflected wave, the autonomous mobile unit estimates a position symmetrical to the transmission position with respect to an obstacle data indicating the wall surface that has reflected the reflected wave to be the position of the transponder.

9. The tracking system according to claim 1, wherein the environment detecting means is at least one sensor selected from a photoelectric sensor and an ultrasonic sensor.

10. The tracking system according to claim 1, wherein the moving object is a human, and the autonomous mobile unit is a cart.

* * * * *